United States Patent
Hansen et al.

(10) Patent No.: US 7,651,619 B2
(45) Date of Patent: Jan. 26, 2010

(54) FILTRATION METHOD AND APPARATUS

(75) Inventors: Preben Bøje Hansen, Gentofte (DK); Peter Stubbe, Birkerød (DK); Hanne Birch, Gentofte (DK); Kirsten Grønning Sørensen, Birkerød (DK)

(73) Assignee: Danmarks Tekniske Universitet (DTU)

( * ) Notice: Subject to any disclaimer, the term of this patent is extended or adjusted under 35 U.S.C. 154(b) by 0 days.

(21) Appl. No.: 10/322,353

(22) Filed: Dec. 23, 2002

(65) Prior Publication Data

US 2003/0146174 A1    Aug. 7, 2003

(30) Foreign Application Priority Data

Dec. 28, 2001 (DK) ............................. 2001 01967
Sep. 13, 2002 (DK) ............................. 2002 01364

(51) Int. Cl.
- B01D 37/00 (2006.01)
- B01D 33/04 (2006.01)
- B01D 33/64 (2006.01)
- B01D 33/46 (2006.01)
- B01D 33/54 (2006.01)

(52) U.S. Cl. .................. 210/695; 210/770; 210/783; 210/791; 210/808; 210/223; 210/350; 210/378; 210/384; 210/386; 210/388; 210/391; 210/396; 210/398; 210/400; 210/401; 210/406

(58) Field of Classification Search .............. 210/739, 210/741, 770–772, 774, 784, 103, 217, 396, 210/402; 100/37, 73, 112, 121; 34/127–130, 34/338, 443, 482, 499
See application file for complete search history.

(56) References Cited

U.S. PATENT DOCUMENTS

| | | | |
|---|---|---|---|
| 2,808,899 A | 10/1957 | Hofstetter | |
| 2,881,072 A * | 4/1959 | Clark | 162/104 |
| 3,019,855 A | 2/1962 | Engle | |
| 3,242,653 A | 3/1966 | Sylvan | |
| 3,459,122 A * | 8/1969 | Pastoors et al. | 100/118 |
| 3,601,039 A * | 8/1971 | Schover | 100/118 |
| 3,605,607 A * | 9/1971 | Gujer | 100/118 |
| 3,613,564 A * | 10/1971 | Adamski et al. | 100/118 |
| 3,747,758 A * | 7/1973 | Kerr | 210/769 |
| 3,783,666 A * | 1/1974 | Rosansky et al. | 72/199 |

(Continued)

FOREIGN PATENT DOCUMENTS

GB    920377    6/1963

(Continued)

*Primary Examiner*—Robert James Popovics
(74) *Attorney, Agent, or Firm*—Gifford, Krass, Sprinkle, Anderson & Citkowski, P.C.

(57) ABSTRACT

A method and an apparatus for separating dry matter from liquid includes an enclosed separation environment capable of being pressure regulated. Within the enclosed separation environment, a suspension is brought into contact with at least one filter so as to accumulate dry matter on the at least one filter. The filter with the dry matter passes through at least one set of rollers such that liquid is removed from the dry matter on the at least one filter to form a substantially dry filter cake. Thereafter, the substantially dry filter cake is removed from the at least one filter. The above steps are performed in the enclosed separation environment either under vacuum or overpressure. The invention may be used in various fields such as the food industry.

96 Claims, 24 Drawing Sheets

U.S. PATENT DOCUMENTS

Figure 1:
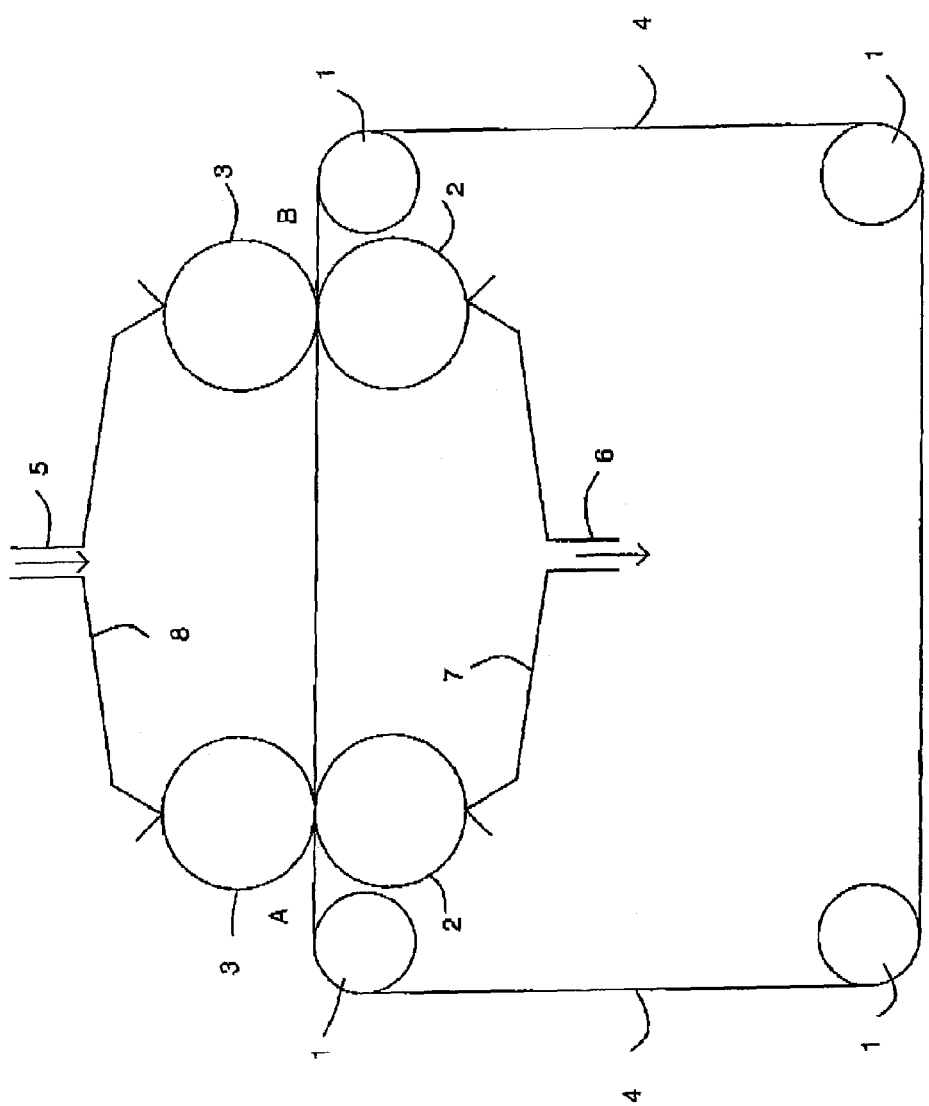

| | | | | |
|---|---|---|---|---|
| 3,796,317 A | * | 3/1974 | Lippert et al. | 210/386 |
| 3,800,952 A | * | 4/1974 | Bastgen | 210/324 |
| 3,812,971 A | * | 5/1974 | Yamamoto | 210/327 |
| 3,821,928 A | * | 7/1974 | Sugita | 100/118 |
| 3,896,030 A | * | 7/1975 | Bahr | 210/384 |
| 3,915,865 A | * | 10/1975 | Haji et al. | 210/329 |
| 3,979,296 A | * | 9/1976 | Bastgen | 210/324 |
| 4,017,398 A | * | 4/1977 | Hartmann et al. | 210/350 |
| 4,033,873 A | * | 7/1977 | Stoltenberg | 210/186 |
| 4,042,507 A | * | 8/1977 | Langmack | 210/158 |
| 4,053,419 A | * | 10/1977 | Pav | 210/386 |
| 4,127,487 A | * | 11/1978 | Havalda | 210/350 |
| 4,137,159 A | * | 1/1979 | Sawyer | 210/770 |
| 4,156,384 A | * | 5/1979 | Hinds et al. | 99/459 |
| 4,260,492 A | * | 4/1981 | Ito et al. | 210/386 |
| 4,417,982 A | * | 11/1983 | Britschgi et al. | 210/386 |
| 4,427,157 A | * | 1/1984 | Klein | 241/15 |
| 4,475,453 A | * | 10/1984 | Davis | 100/118 |
| 4,481,118 A | * | 11/1984 | Heissenberger et al. | 210/783 |
| 4,563,278 A | | 1/1986 | Mutzenberg et al. | |
| 4,565,602 A | * | 1/1986 | Haartti et al. | 162/56 |
| 4,643,826 A | * | 2/1987 | Prunier | 210/225 |
| 4,676,902 A | * | 6/1987 | Fayoux et al. | 210/350 |
| 4,707,260 A | * | 11/1987 | Nagayama et al. | 210/386 |
| 4,707,272 A | * | 11/1987 | Kistler | 210/709 |
| 4,740,305 A | * | 4/1988 | Miller | 210/783 |
| 4,827,853 A | * | 5/1989 | Emery | 110/223 |
| 4,921,608 A | * | 5/1990 | Lee | 210/393 |
| 5,021,166 A | * | 6/1991 | Torpey | 210/709 |
| 5,230,809 A | * | 7/1993 | Roslonski | 204/518 |
| 5,366,626 A | | 11/1994 | Pierson | |
| 5,382,327 A | | 1/1995 | Seifert et al. | |
| 5,390,428 A | * | 2/1995 | Pummell | 34/273 |
| 5,433,851 A | | 7/1995 | Itoh | |
| 5,456,832 A | * | 10/1995 | Louden et al. | 210/386 |
| 5,482,594 A | | 1/1996 | Salminen | |
| 5,543,044 A | * | 8/1996 | Louden et al. | 210/386 |
| 5,656,179 A | * | 8/1997 | Gehrmann et al. | 210/771 |
| 5,840,187 A | * | 11/1998 | Derenthal et al. | 210/400 |
| 5,879,551 A | * | 3/1999 | Kolmar et al. | 210/401 |
| 6,004,468 A | * | 12/1999 | Barbulescu et al. | 210/739 |
| 6,101,739 A | * | 8/2000 | Rutz et al. | 34/373 |
| 6,241,900 B1 | * | 6/2001 | Nakamura et al. | 210/769 |
| 6,514,381 B1 | * | 2/2003 | Stotz | 162/56 |
| 2003/0146174 A1 | * | 8/2003 | Hansen et al. | 210/770 |

FOREIGN PATENT DOCUMENTS

| | | |
|---|---|---|
| WO | WO 01/58563 | 8/2001 |
| WO | WO 03055570 A1 * | 7/2003 |
| WO | WO 2006002638 A1 * | 1/2006 |

* cited by examiner

FILTRATION METHOD AND APPARATUS

TECHNICAL FIELD OF THE INVENTION

The present invention relates to the field of filtering, more precisely the present invention concerns a method and an apparatus for the separation of dry matter from liquid and the use of said method and apparatus.

BACKGROUND OF THE INVENTION

Separation of dry matter from liquid is known in the art. Methods such as precipitation, centrifugation and filtering are commonly used for separation purposes in a vast number of industries. The latter separation method is relevant for the present invention.

Several problems concerning the separation of dry matter from liquid exist. In precipitation the particles in the liquid precipitate. Often a precipitation agent is added to the liquid. After precipitation the dry matter is situated on the bottom as sludge, wherein the sludge will still comprise a good deal of liquid, particularly in the area between the sludge and the liquid.

Centrifugation is a accelerated type of precipitation, where agents aiding the separation is also added. Centrifugation is a very expensive separation method.

When filtering liquids having a high dry matter content there are significant problems concerning accumulation of dry matter on the filter. This accumulation is known as the filter cake. In conventional methods the filter cake will grow until further filtering is impossible and the filter then has to be cleaned. There are various techniques for limiting the filter cake. One such technique is cross-flow. Here, the suspension (feed stream) is made to move along the filter in such a way that the filter cake is forced to move along by the stream.

Another filtering method is back flushing. Here, the movement of the suspension is reversed to lift the filter cake from the filter.

When using the cross-flow or back flushing methods the filter cake is not accumulated on the filter but is accumulated in the suspension. This requires the filtering process to be either stopped or for the existence of an outlet for the accumulated dry matter. In the latter situation the removed dry matter will still have a relatively high liquid content.

A further filtering method is flushing. The filtering process is stopped and the filter is washed. Here, the dry matter is accompanied by a lot of liquid.

In U.S. Pat. No. 4,310,424 suspended particles from waste suspensions are removed by the means of a rotating drum barrel under pressure. Bigger particles will be deposited on a polymer network and smaller particles will be retained in a hydrophobic foam.

In "Filtration and Separation", 1988 (improving cake dewatering) a system for the removal of water from sludge is described. The sludge is led pass a transport convey belt for partial dehydration. Hereafter, the sludge is led between 2 layers of synthetic filters, which in a continuing process is pressed through rollers. The first transport convey belt is not passed through the sludge suspension.

Nalco Chemical Company (1985) is disclosing a system for the dehydration of sludge from steel production by a twin-belt-filtering method. Sludge is pressed through two filter belts by the means of a pair of rollers. Two filter belts are used, wherein none is passed through the sludge suspension.

The above problems are overcome by the present invention by presenting a method and an apparatus capable of continuously removing dry matter from a liquid having a high dry matter content, and thereby provide a method and apparatus capable of reducing the loss of a liquid from the suspension and at the same time having an increased filtering capacity and a economical advantage over the prior art.

SUMMARY OF THE INVENTION

The present invention concerns a method for separating dry matter from liquid, comprising the steps of
i) providing an enclosed separation environment capable of being pressure regulated, and in said enclosed separation environment
ii) contacting at least one filter with a suspension accumulating dry matter on the at least one filter, and
iii) obtaining a filter cake, and
iv) passing the at least one filter through at least one set of rollers, whereby liquid is removed from the at least one filter,
v) obtaining a substantially dry filter cake,
vi) removing the substantially dry filter cake from the at least one filter, wherein steps i) to iv) are performed in the same enclosed separation environment either under vacuum or overpressure.

In a further aspect the invention relates to an apparatus for the separation of dry matter from liquid, comprising the steps of
i) providing an enclosed separation environment capable of being pressure regulated, and in said enclosed separation environment
ii) contacting at least one filter with a suspension accumulating dry matter on the at least one filter, and
iii) obtaining a filter cake, and
iv) passing the at least one filter through at least one set of rollers, whereby liquid is removed from the at least one filter,
v) obtaining a substantially dry filter cake,
vii) removing the substantially dry filter cake from the at least one filter, wherein steps i) to iv) are performed in the same enclosed separation environment either under vacuum or overpressure.

By using the method and/or apparatus of the invention a substantially dry filter cake is obtained. In a further aspect of the invention the use of such substantially dry filter cake is within the scope of the invention.

The present invention further focuses on the use of the above method and apparatus.

DRAWINGS

FIG. 1: shows a basic separation apparatus capable of continuous filtration, wherein the system is closed. The filter (4) is moving in the direction of A to B. The filter (4) is guided by rollers (1) controlling and securing the filter (4). The filter (4) is passing through a set of rollers (2) and (3) in the filtration area. (5) is the inlet through which the suspension to be separated is led, and (6) is the outlet for the filtered suspension, (7) is collecting the suspension and may be formed as a spring in the longitudinal direction of the rollers (2) and (3). The active filtration area is enclosed by a metal shield (8) having the effect of a spring in the longitudinal direction of the rollers (3) and (2).

Figure 2:
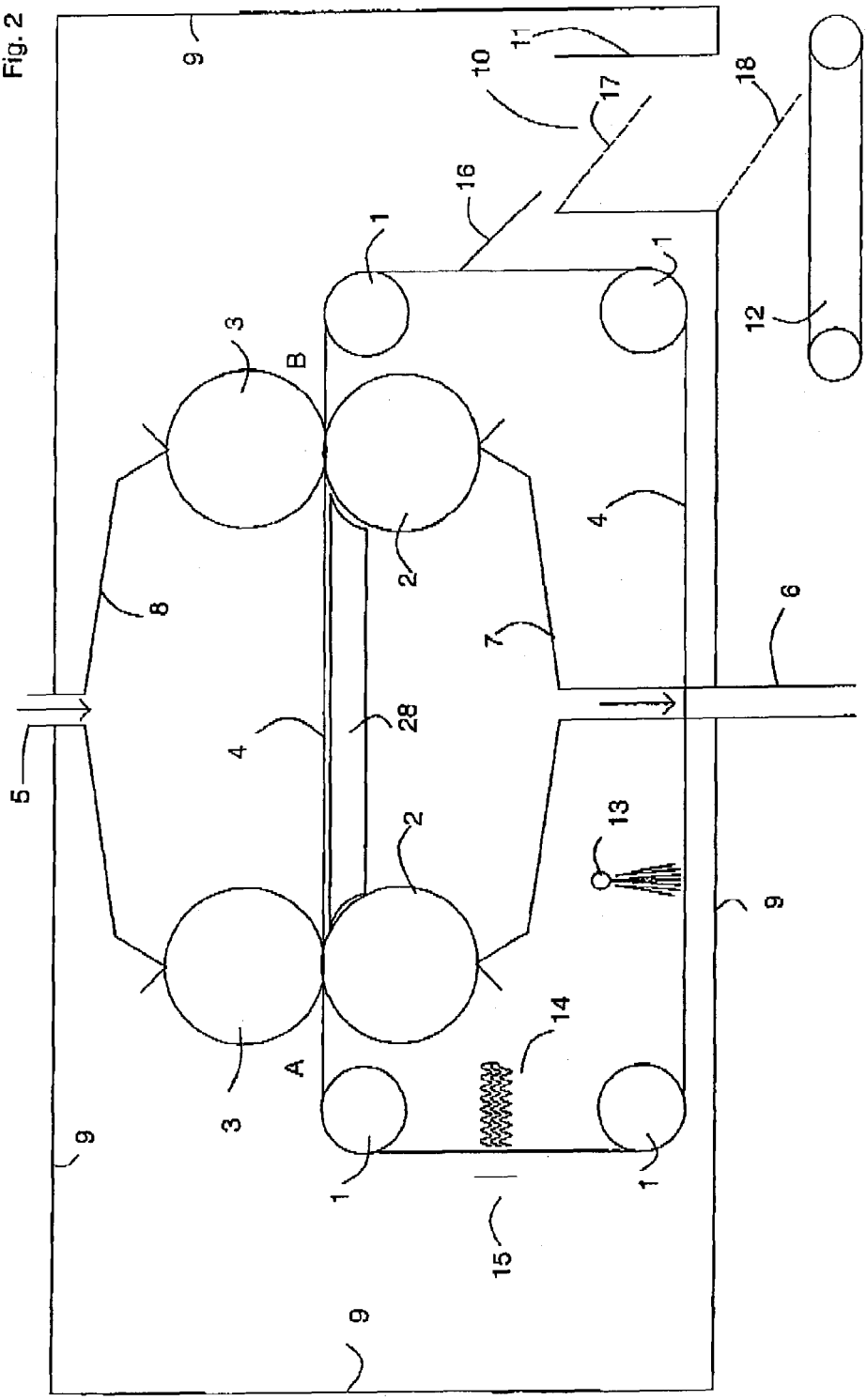

FIG. 2: shows a separation apparatus as a closed system similar to FIG. 1, wherein a filter (4) is moving in the direction of A to B. The filter (4) is guided by rollers (1) controlling and securing the filter (4). The filter (4) is passing through a set of rollers (2) and (3) in the filtration area, where it is supported by a perforated plate (28) allowing the passage of suspension. (5) is the inlet through which the suspension to be separated is led, and (6) is the outlet for the filtered suspension. (7) is collecting the suspension and may be formed as a spring in the longitudinal direction of the rollers (2) and (3). The active filtration area is enclosed by a metal shield (8) having the effect of a spring in the longitudinal direction of the rollers (3) and (2). The closed system can be exposed to a pressure and scrapers (16) are provided which remove the accumulated filter cake or particles and/or objects continuously from rollers (3) and (2) and/or filter (4). The accumulated filter cake or particles and/or objects are removed through an outlet (10) after falling from the scraper (16) of said filter into a housing (11). (18) is open when (17) is closed and vise versa. The accumulated filter cake or particles and/or objects are removed via a conveyer belt (12). (9) is a housing for the separation apparatus, (14) is a control unit and (15) is monitoring equipment associated with (14). (13) is a continuous filter cleaning and disinfection unit.

Figure 3:
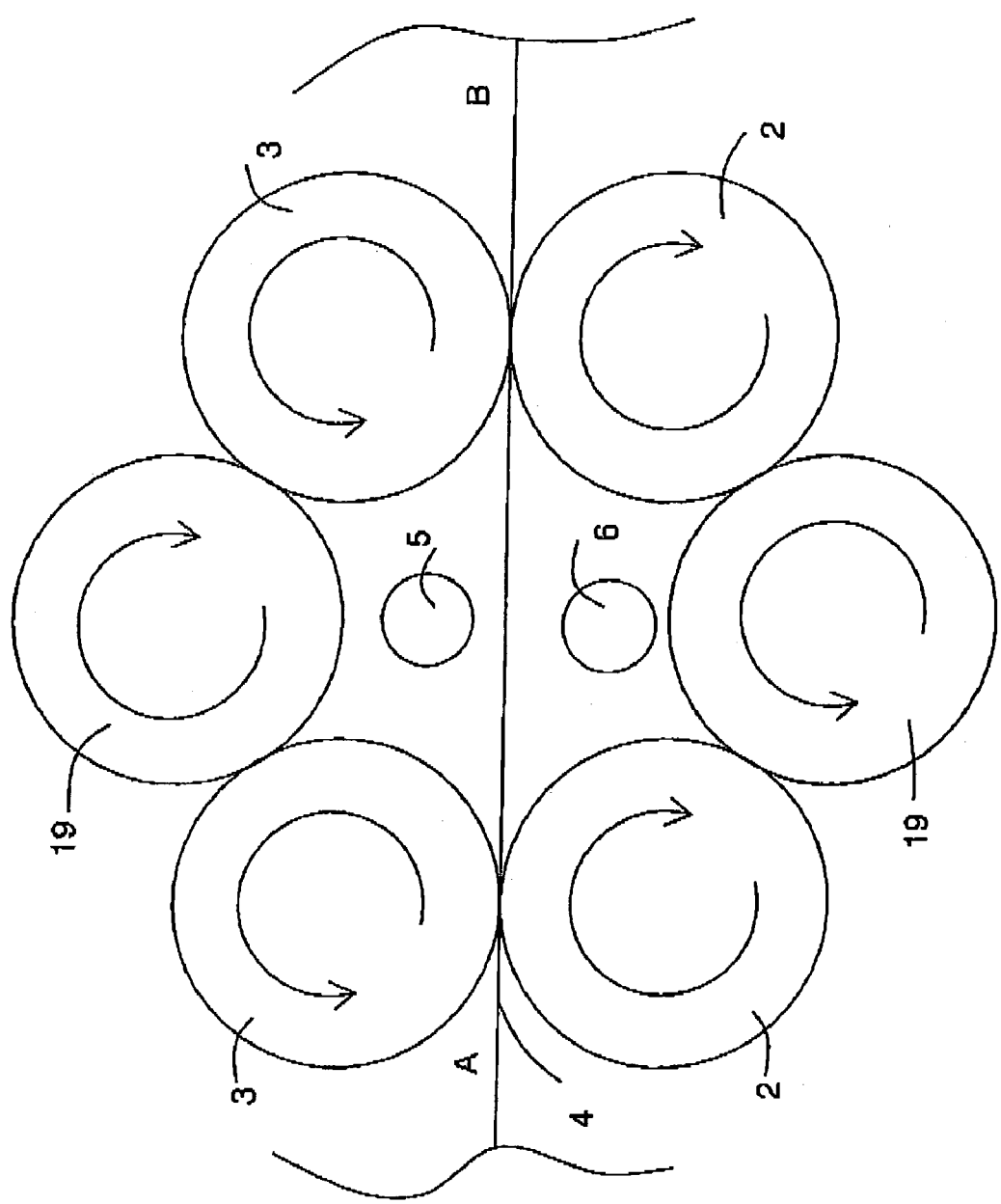

FIG. 3: shows the system as in FIG. 1-2 wherein the rollers (19) are used to close the system in the top and bottom, connecting rollers (2) and (3) respectively. (4) is the filter, (5) the inlet through which the suspension to be separated is led, and (6) is the outlet for the separated suspension.

Figure 4:
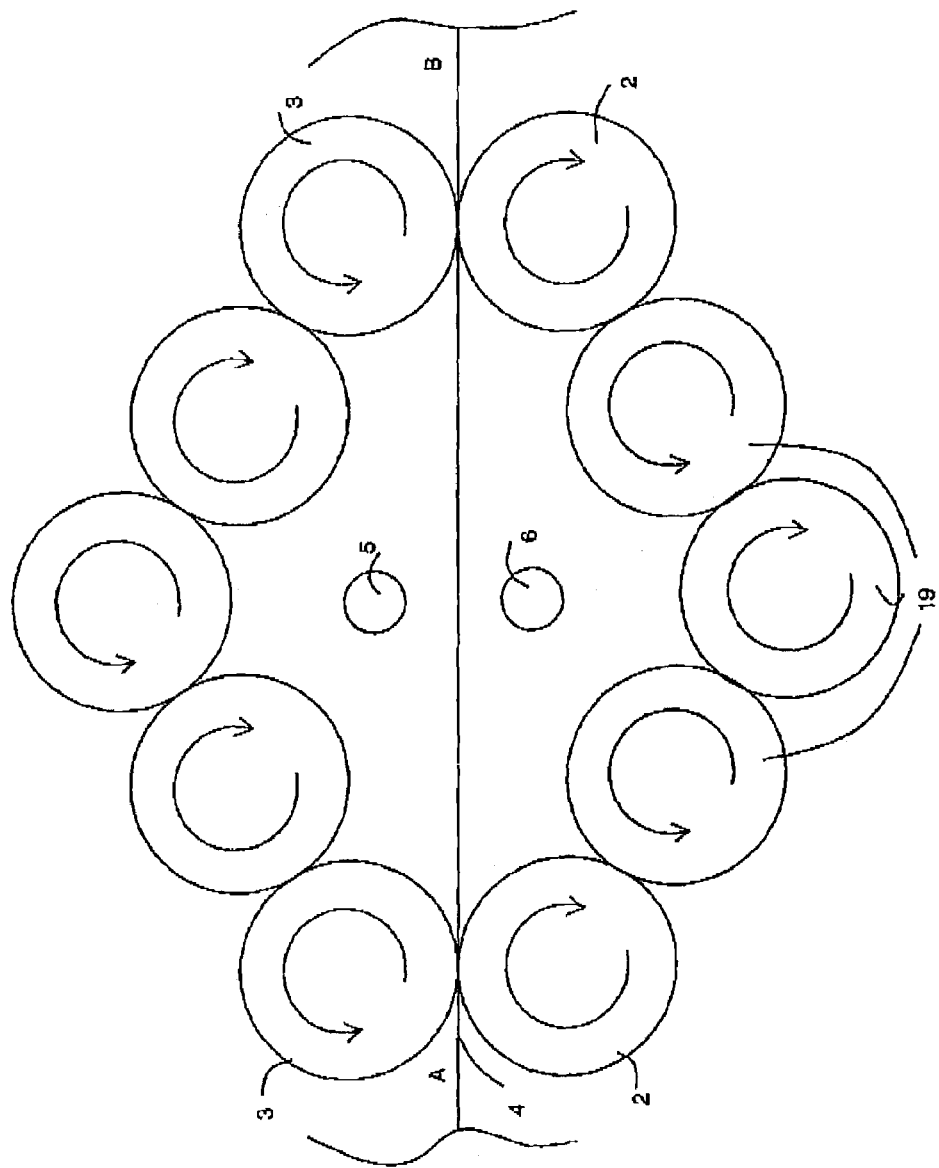

FIG. 4: shows the system as in FIG. 3, wherein the rollers (19) are used to close the system in the top and bottom, connecting rollers (2) and (3) respectively. (4) is the filter, (5) the inlet through which the suspension to be separated is led, and (6) is the outlet for the separated suspension.

Figure 5:
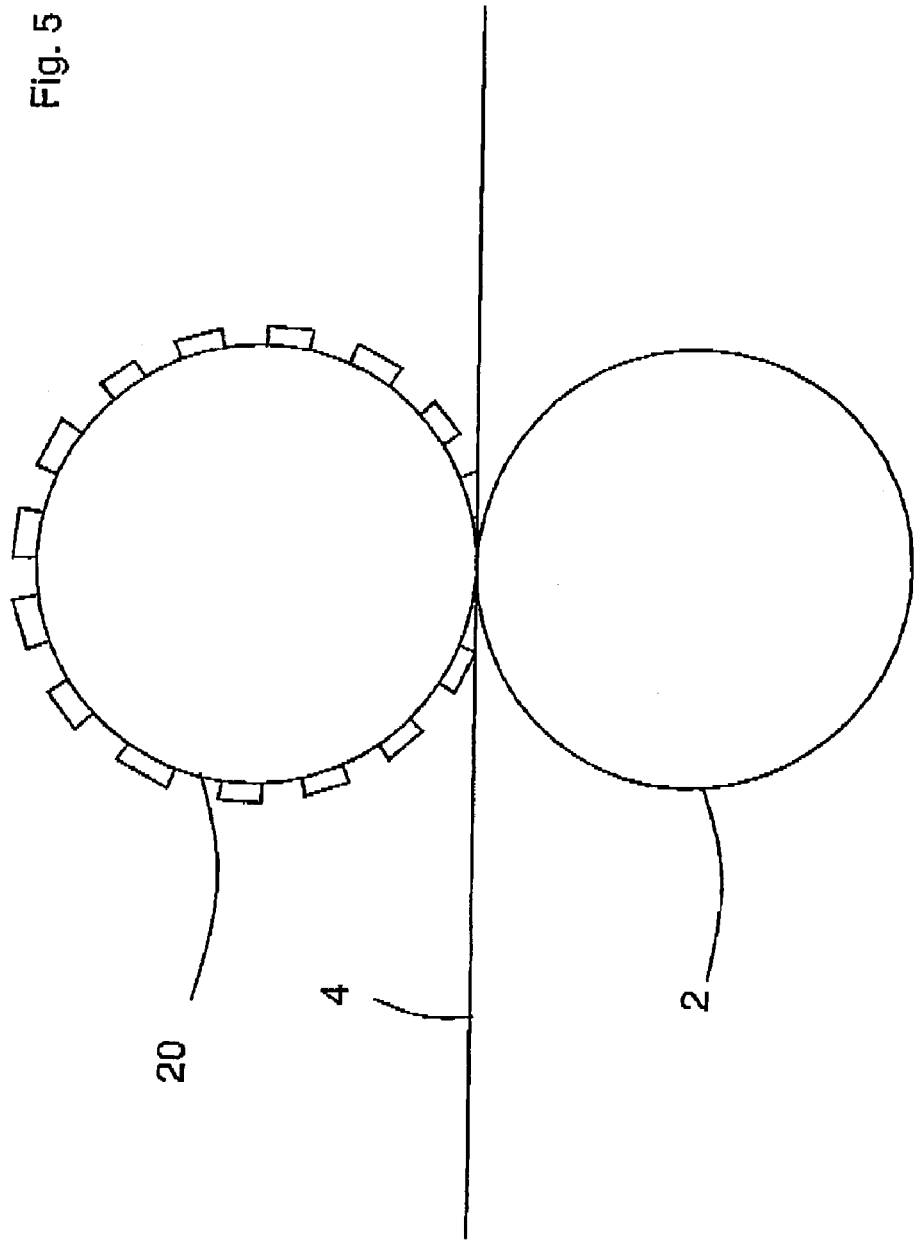

FIG. 5: shows the rollers (2) and (20) comprising grooves. The grooves collect a slippery filter cake that can be difficult to catch for a smooth roller. The grooves permit liquid to escape back into the separating area.

Figure 6:
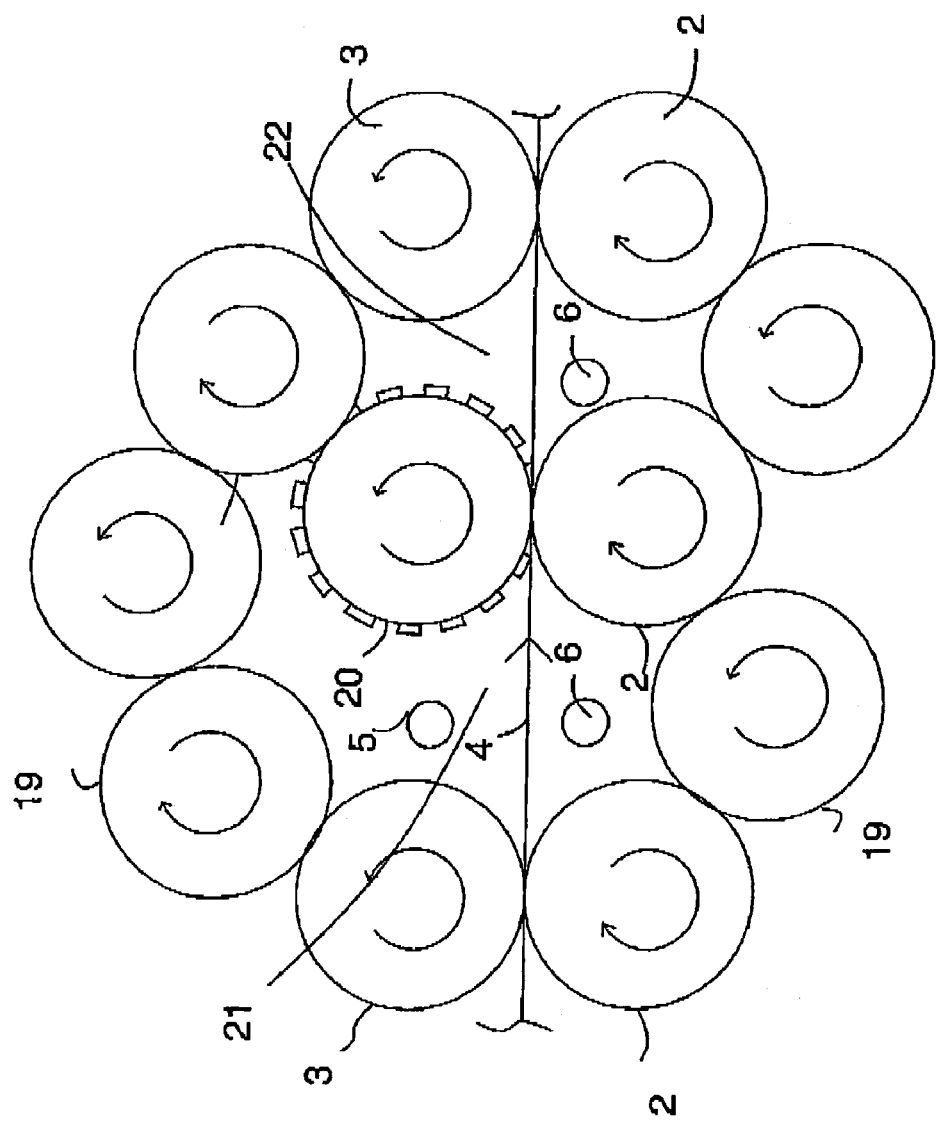

FIG. 6: shows a separation apparatus comprising multiple rollers (19) enclosing the separation area in the top and bottom. A suspension enters chamber (21) through inlet (5) and leaves through outlet (6). The filter cake accumulated on the filter (4) is collected by the grooves in roller (20). The filter cake is pressed before entering chamber (22). Before leaving the chamber (22) the filter cake is pressed between the rollers (2) and (3).

Figure 7:
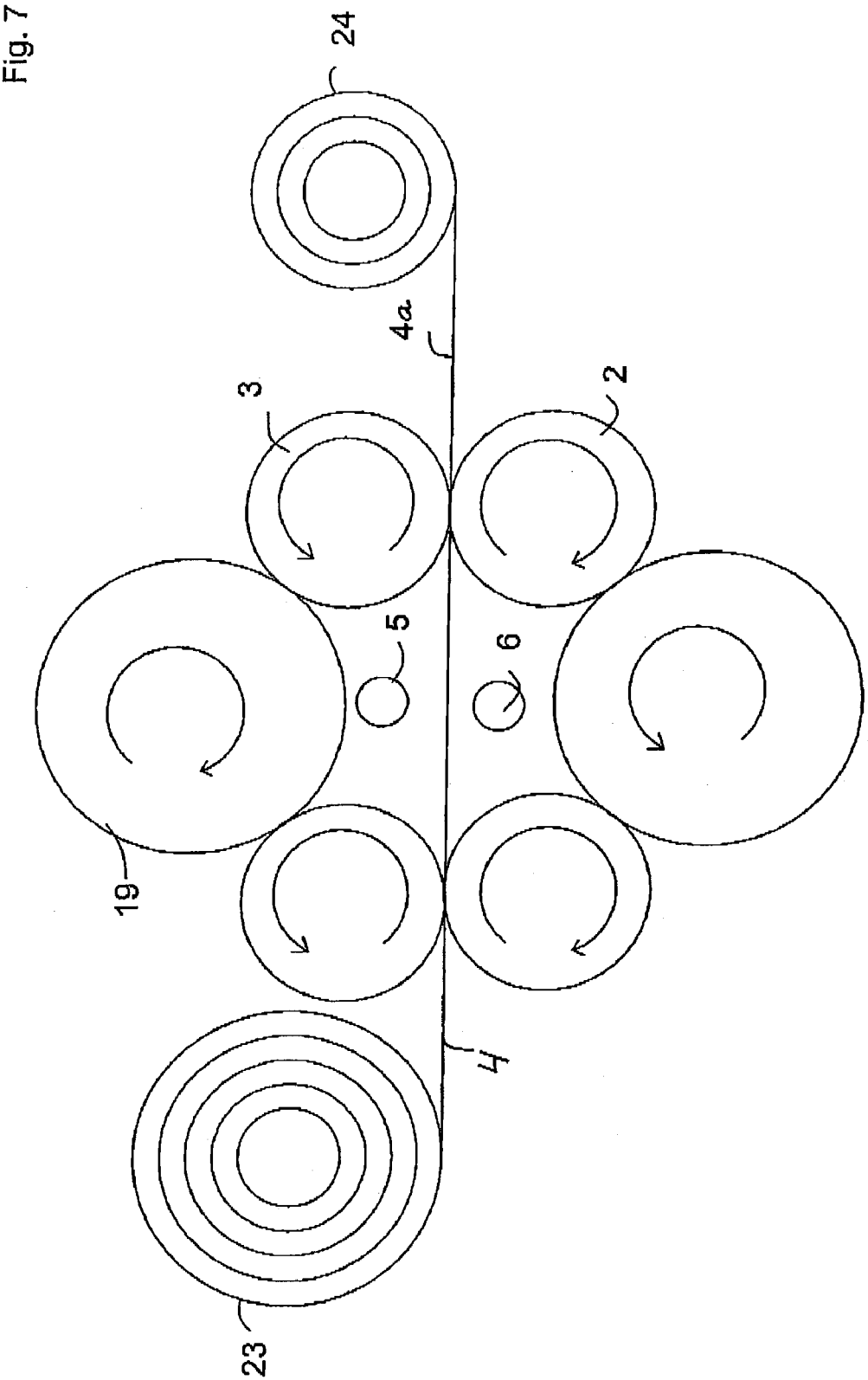

FIG. 7: depicts the separation apparatus, wherein the filter (4) is rolled up in a coil (23) instead of being a band. The used filter (4d) is collected in a coil (24).

Figure 8:
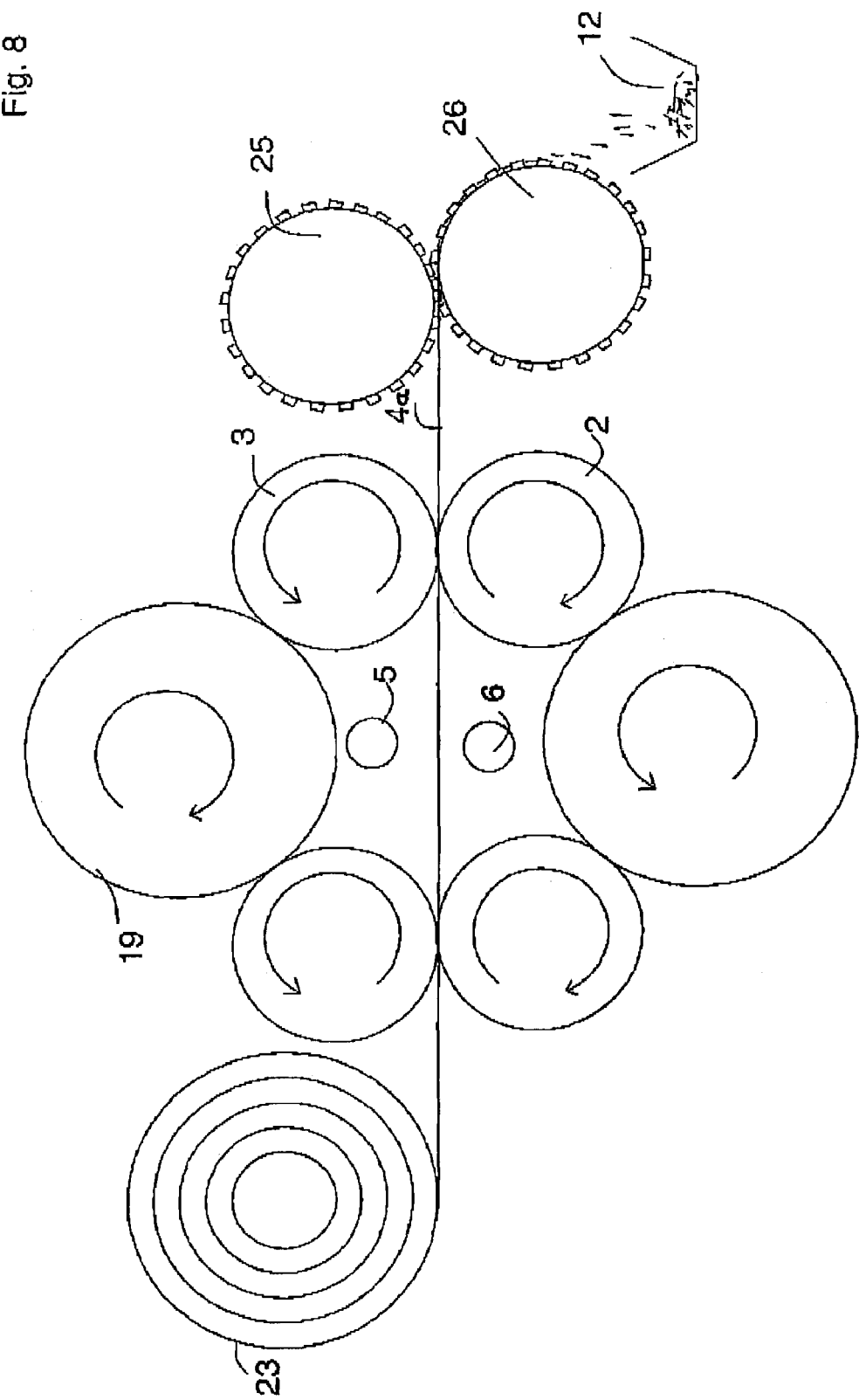

FIG. 8: shows the separation apparatus, wherein the used filter is chopped with a chopping device (25) and (26) capable of chopping and triturating the filter and accumulated dry filter cake or particles and/or objects, which are collected in (12).

Figure 9:
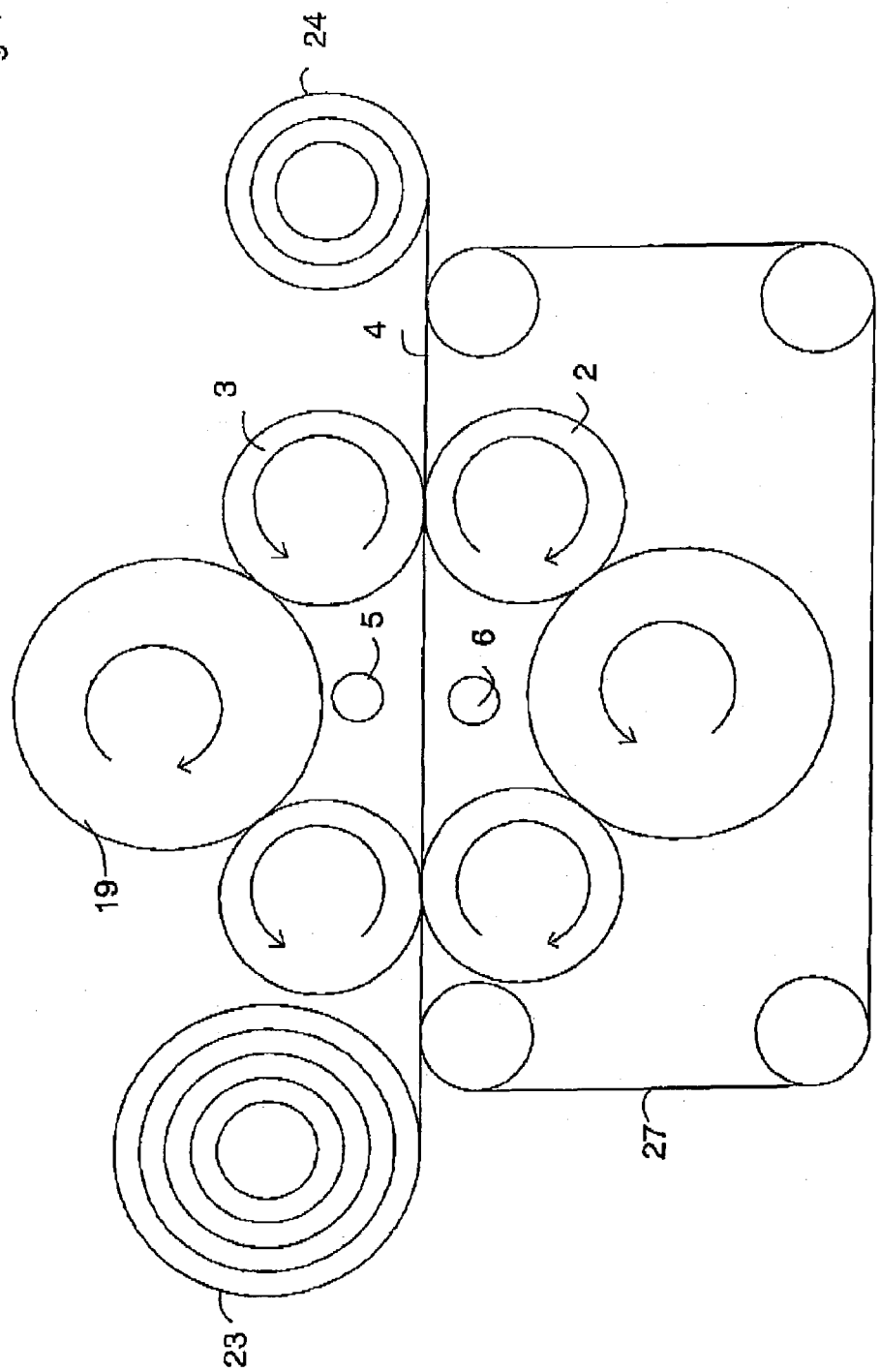

FIG. 9: shows the separation apparatus as in FIGS. 3 and 7 comprising both a filter (4) and a supporting filter (27). The filter (4) is supplied from a coil (23) and wound on another coil (24) after use.

Figure 10:
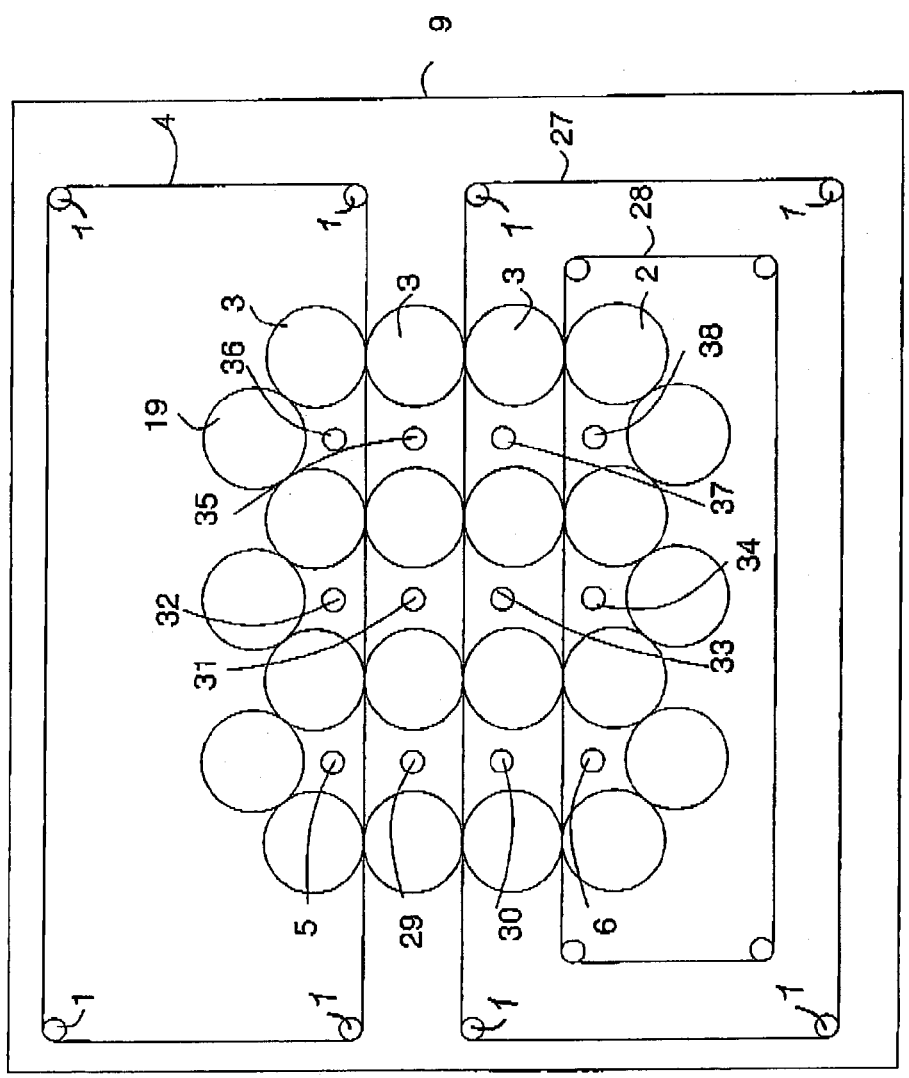

FIG. 10: shows a separation apparatus comprising a multistep system with washing of the filter cake. The separation apparatus is an extension of the apparatus described in FIG. 3. (1) are support rollers. (2), (3) and (19) are rollers enclosing the separating areas (72), (74), (76). A suspension enters through inlet (5). It is filtered through the filter (4) to reach an intermediate state where it can be diluted or filter aid can be added through inlet (29). From here it is filtered again through the filter (27) to reach a new intermediate state where it can be diluted or filter aid can be added through inlet (30). After the final filtration through filter (28) the suspension is removed through outlet (6). The filter cake produced in each step can be washed by adding a washing medium through inlets (32), (31) and (33). The washing medium with the removed components from the filter cake leaves the system through outlet (34). The washing process can be repeated by adding a washing medium through inlets (35), (36) and (37) which leaves through outlet (38).

Figure 11:
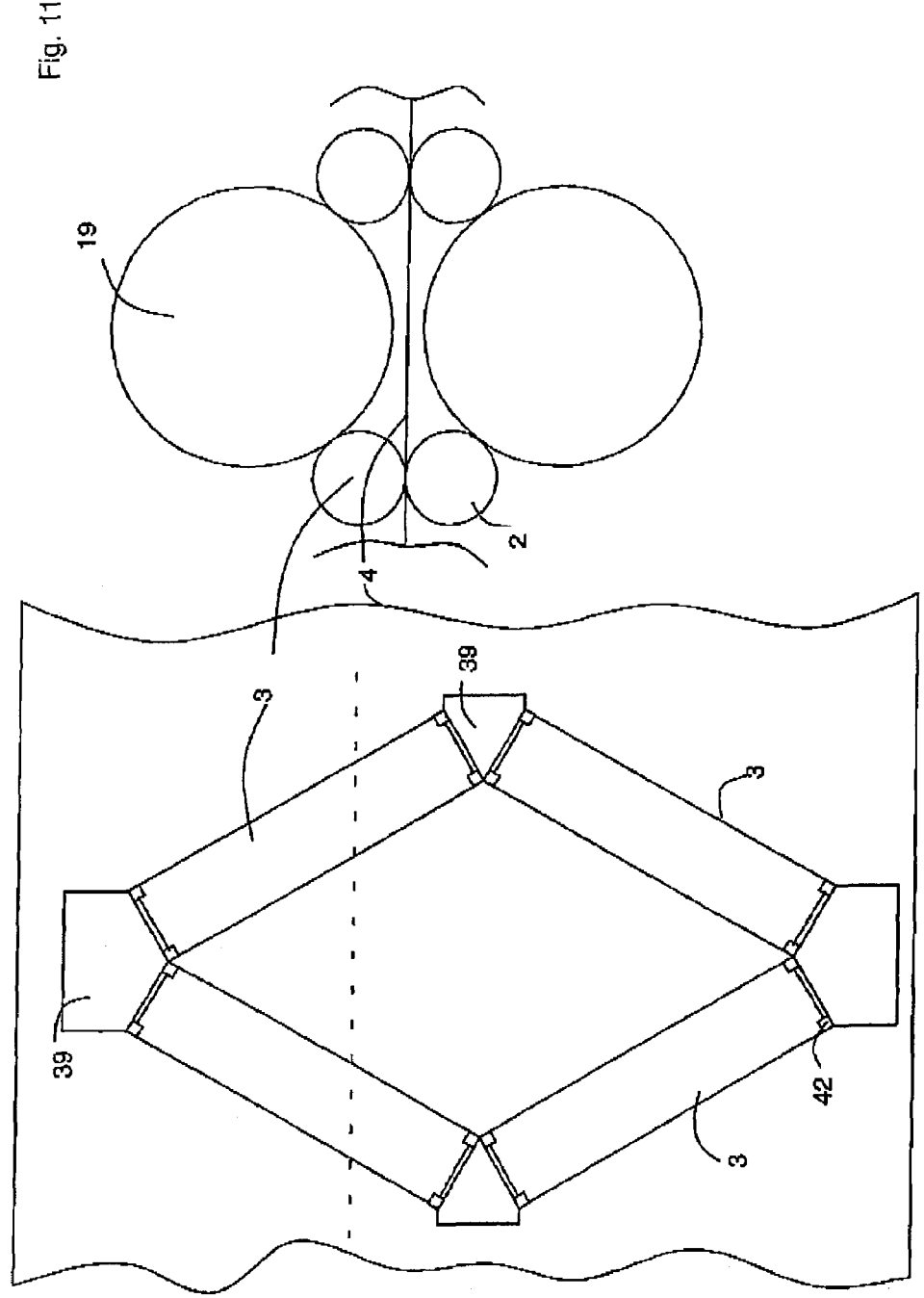

FIG. 11: shows a separation apparatus as described in FIG. 3 but where the rollers (2) and (3) enclosing the separation area are not parallel in the two sides of the separation area. The rollers (19) enclosing the separation area in the top and bottom have the biggest diameter in the middle which gradually decreases towards the ends of the rollers (19). (39) are blocks connecting the rollers (2) with (2) and (3) with (3). (42) are gaskets at the rim of the rollers (2) and (3) avoiding leakage between the rollers (2) and (3) and the blocks (39).

Figure 12:
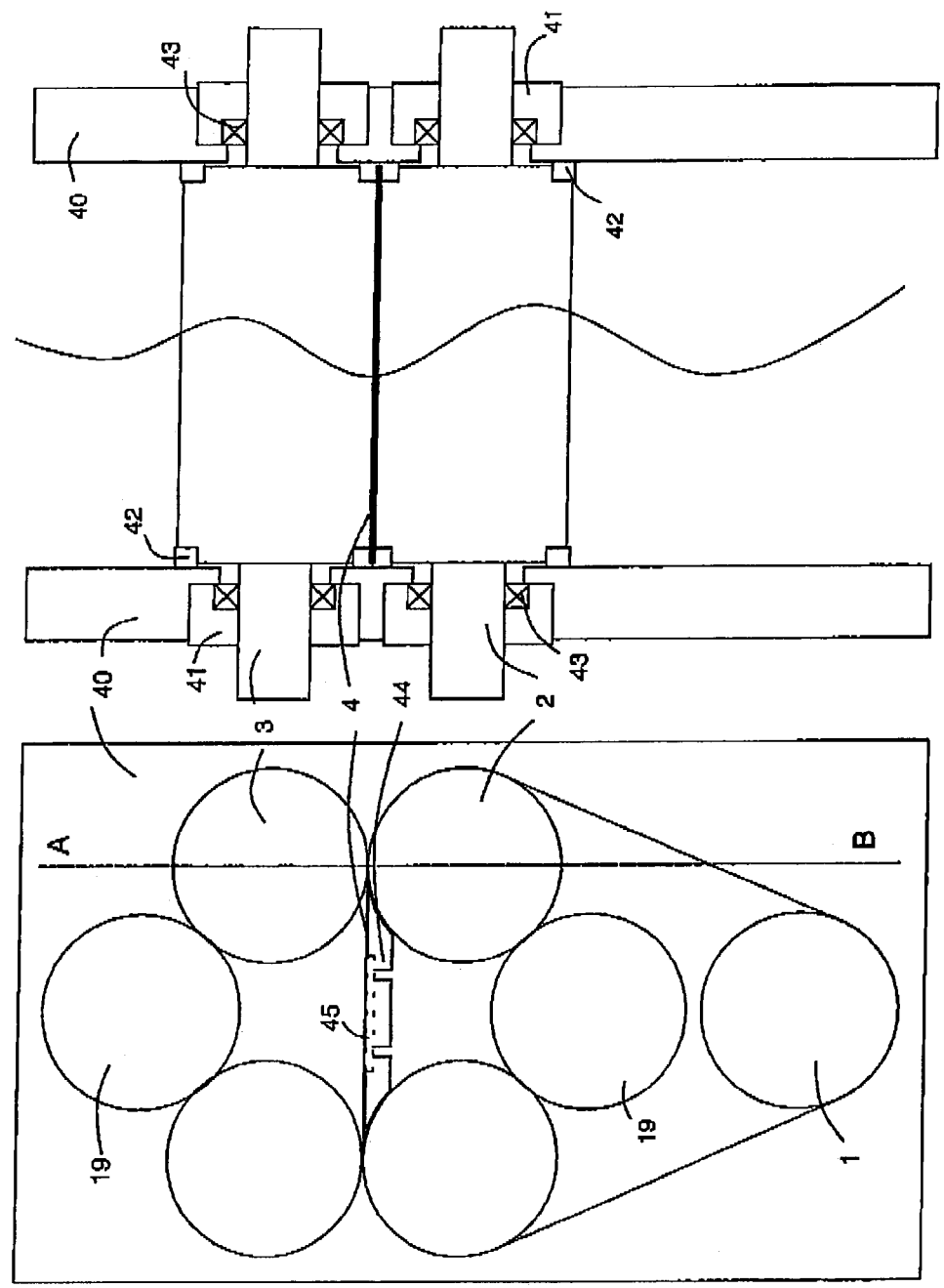

FIG. 12: shows a side view and a cross section through A to B of a separation apparatus as described in FIG. 3. (1) is a support roller, (2) and (3) are rollers enclosing the separation area in cooperation with rollers (19). The filter (4) is supported by a perforated plate (44) in the separation area. (45) is a plate with a finer perforation than (44) to give a more uniform support for the filter (4). (40) are end plates enclosing the separation area at the rollers (2), (3) and (19). (42) are gaskets at the rim of the rollers (2), (3) and (19) to prevent the separated suspension from escaping along the ends of the rollers (2), (3) and (19). (43) are bearings to support the rollers (1), (2), (3) and (19) and (41) are housings for the bearings (43). To allow adjustments of the rollers (1), (2), (3) and (19) the housings (41) for the bearings (43) can be excentric. By turning the excentric housings (41), the pressure on the filter cake can be altered.

Figure 13:
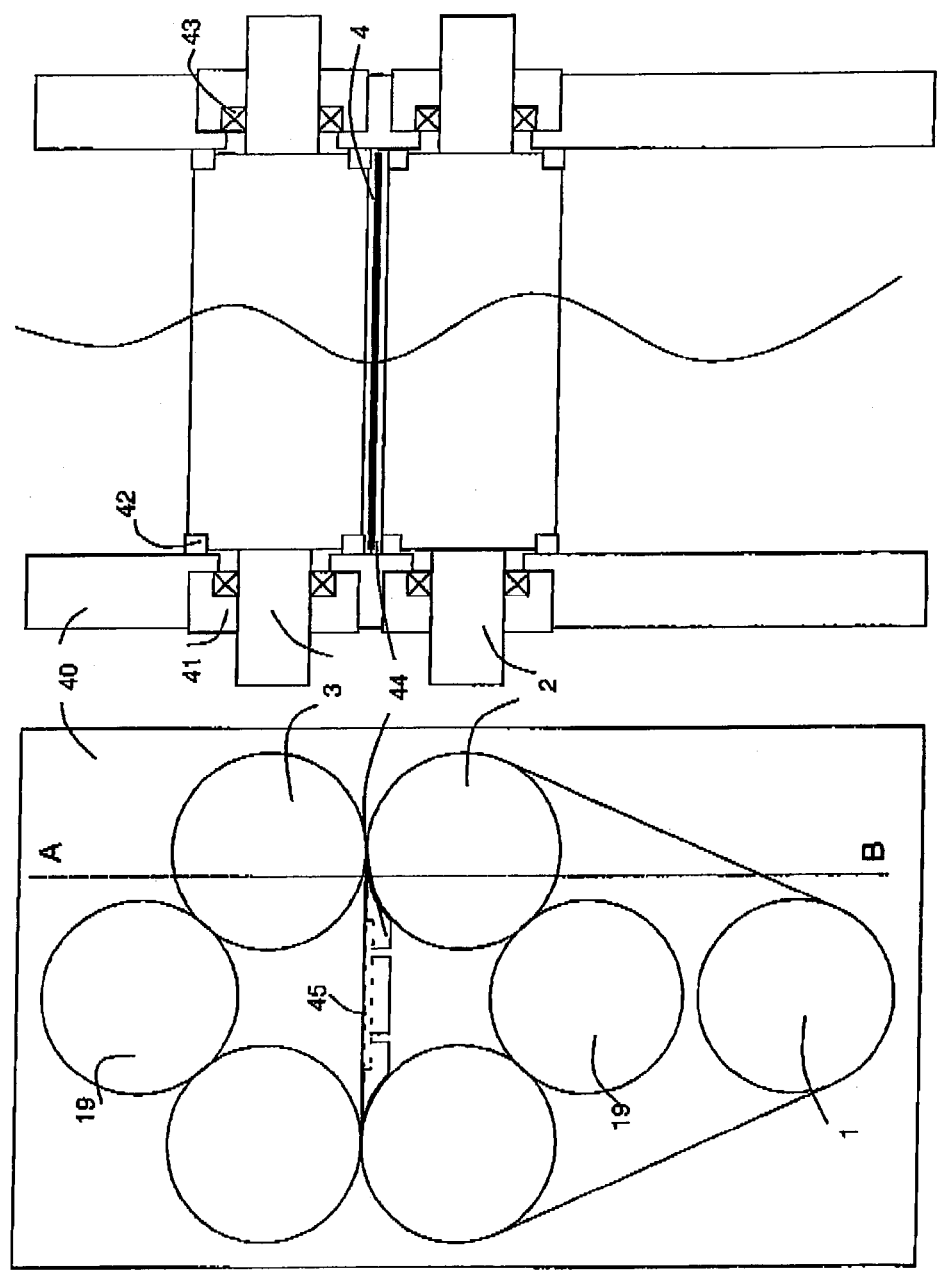

FIG. 13: shows the same separation apparatus as described in FIG. 12 except the cross section A to B, which is moved away from where the rollers (2) and (3) are in contact. This shows the supporting plate (44) in contact with roller (2) underneath the filter (4).

Figure 14:
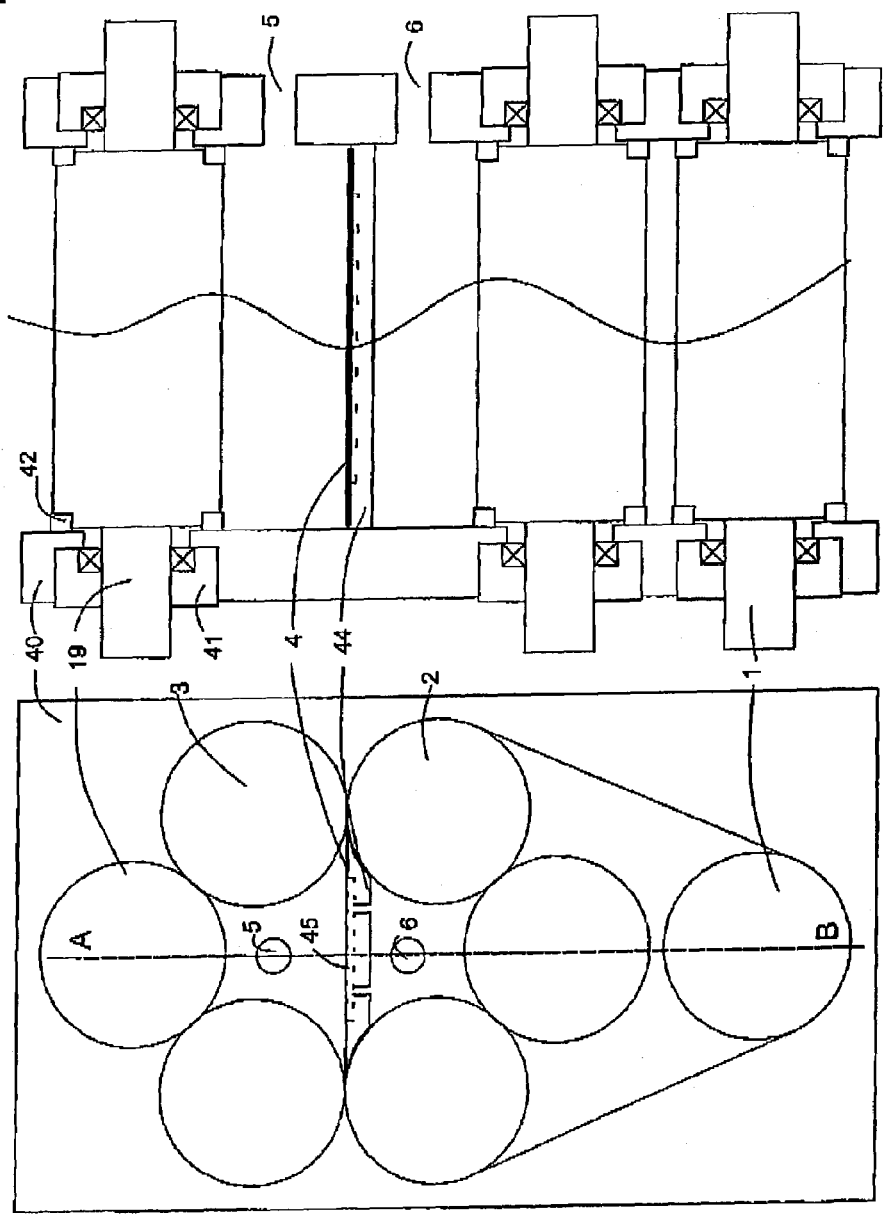

FIG. 14: shows the same separation apparatus as described in FIGS. 12 and 13 except the cross section A to B is placed in the middle of the separation area. The cross section shows that the filter (4) is wider than the perforated plate (45) so the separated suspension has to pass the filter (3) to reach the outlet (6).

Figure 15:
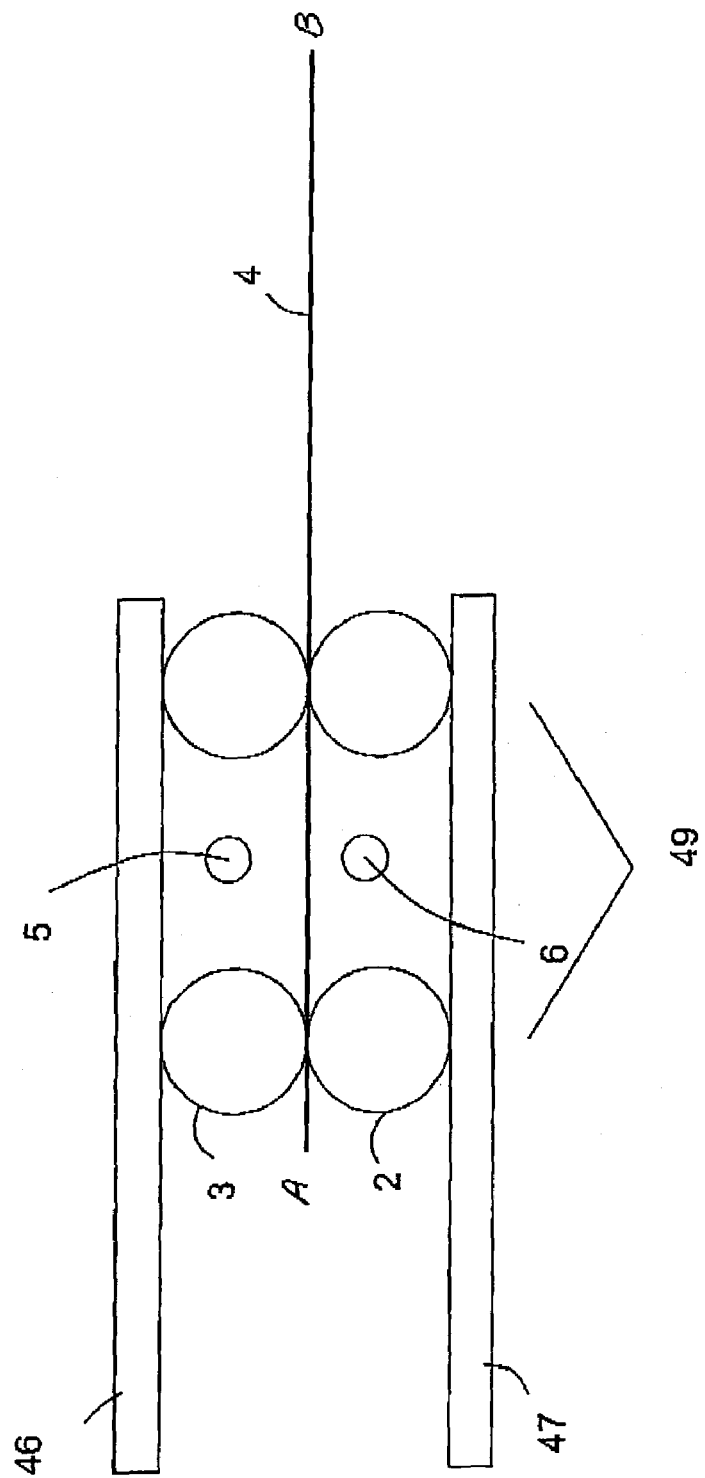

FIG. 15: shows a separation apparatus where the filter (4) is a flat plate that moves from A to B through the separation area (49) enclosed by the rollers (2) and (3). When the filter (4) meets the outer limit, the direction of movement is reversed. The suspension enters through inlet (5) and leaves through outlet (6). (46) and (47) are top and bottom plates enclosing the separation area (49). (46) and (47) are moving from B to A in the opposite direction of the filter (4).

Figure 16:
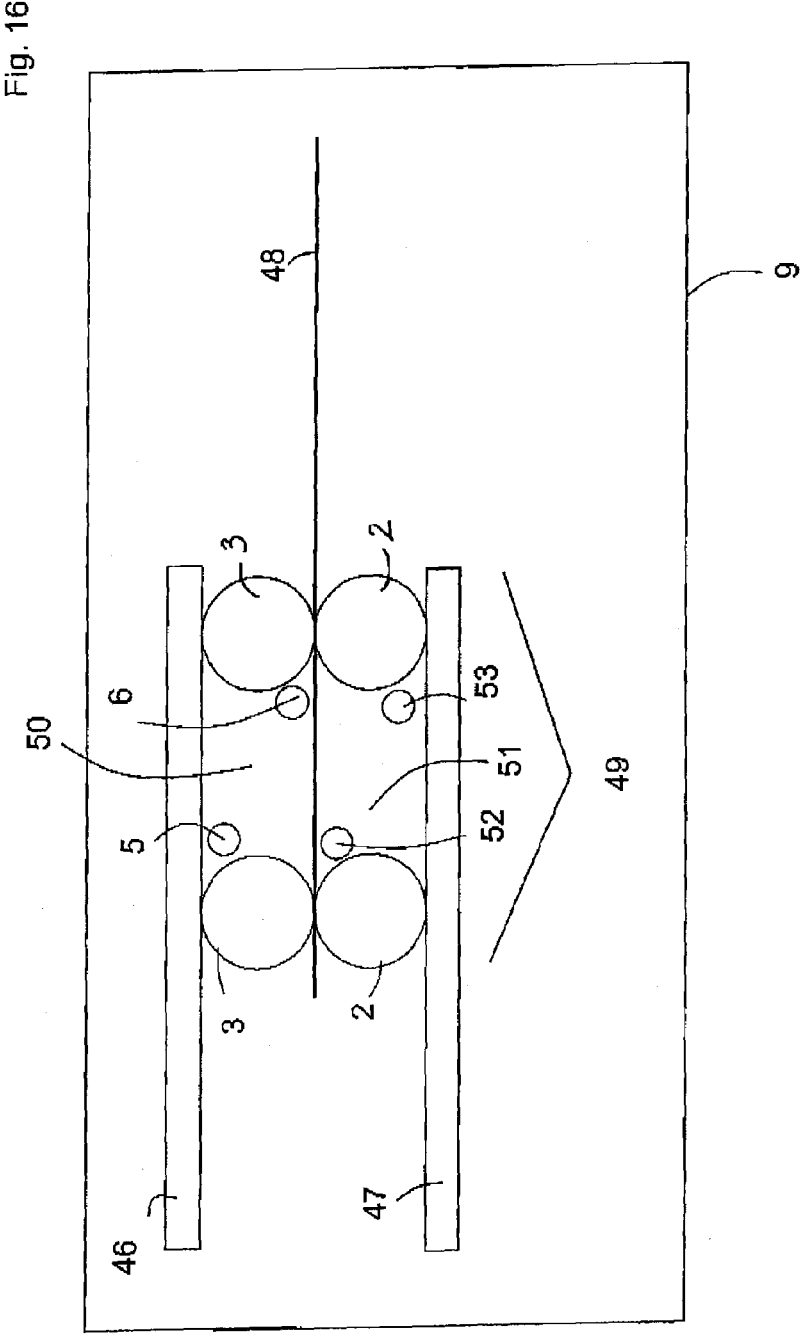

FIG. 16: shows a separation apparatus for upconcentration. The separation area (49) is divided in two chambers (50) and (51) by a solid plate (48). The suspension to be upconcentrated is circulated in chamber (50) through inlet (5) and outlet (6). A cooling suspension is circulated in chamber (51) through inlet (53) and outlet (52). Due to cooling of the plate (48), the water in the suspension to be upconcentrated will freeze on the plate (48). The plate (48) moves out of the separation area (49) through rollers (2) and (3) either to the left or the right and the ice can be removed from the plate (48) outside the separation area (49).

Figure 17:
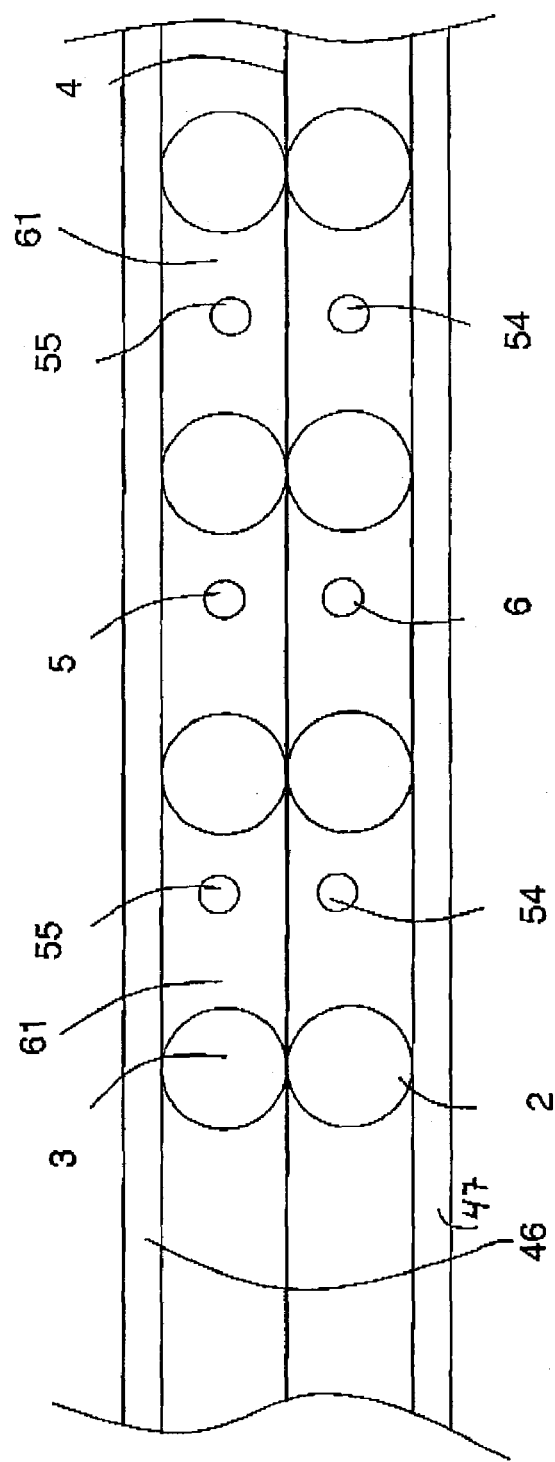

FIG. 17: shows the separation apparatus as in FIG. 15 with additional chambers (61) for removing the filter cake in a closed system. A flushing suspension enters through inlet (54) lifting the filter cake from the filter (4) and transporting it away through outlet (55).

Figure 18:
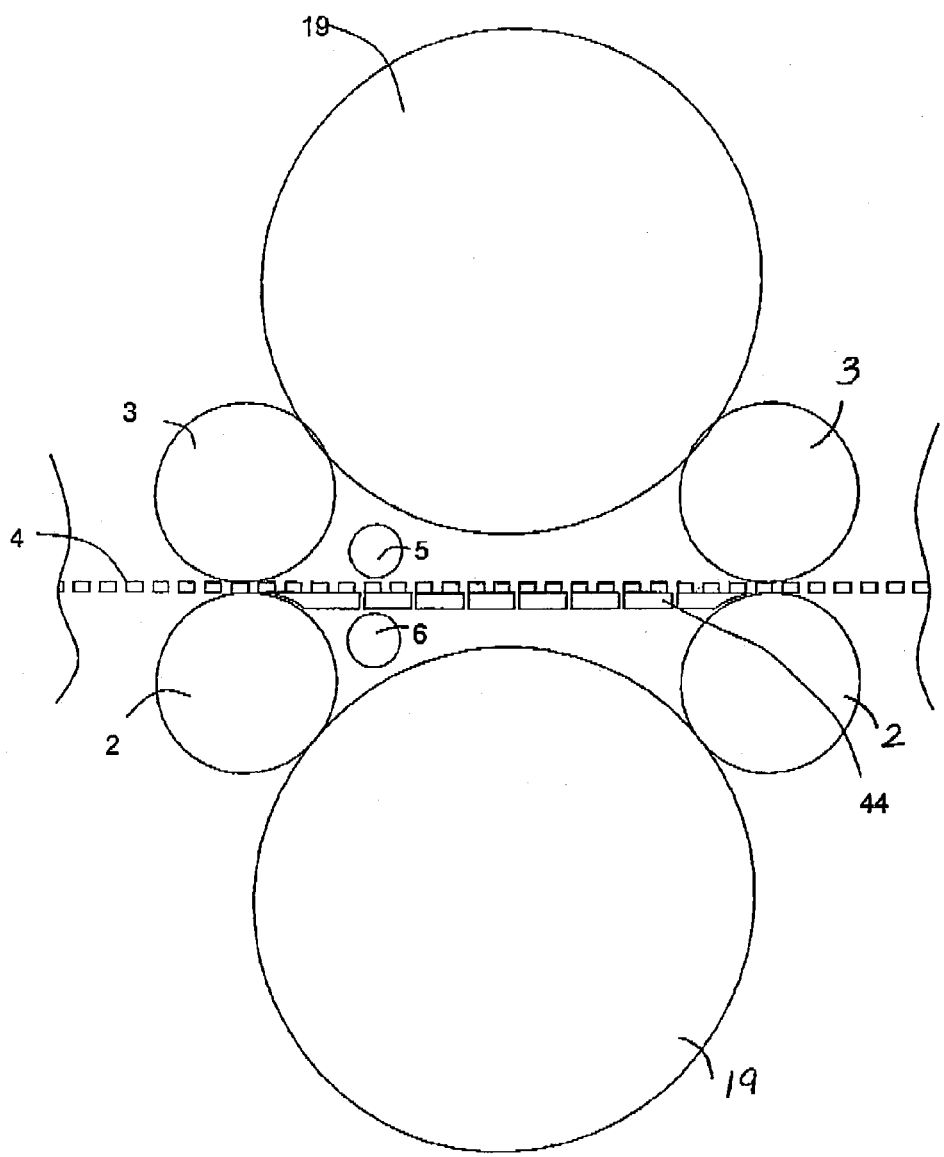

FIG. 18: shows a separation apparatus as described in FIG. 3. Here the filter (4) is supported by a perforated plate (44). The perforation in the plate (44) may have the same perforation as the filter thereby, the filtration is performed in cooperation between (4) and (44), where (4) continuously transports the filter cake away through rollers (2) and (3). The perforated plate (44) may act as a guard against leaks in the filter (4).

Figure 19:
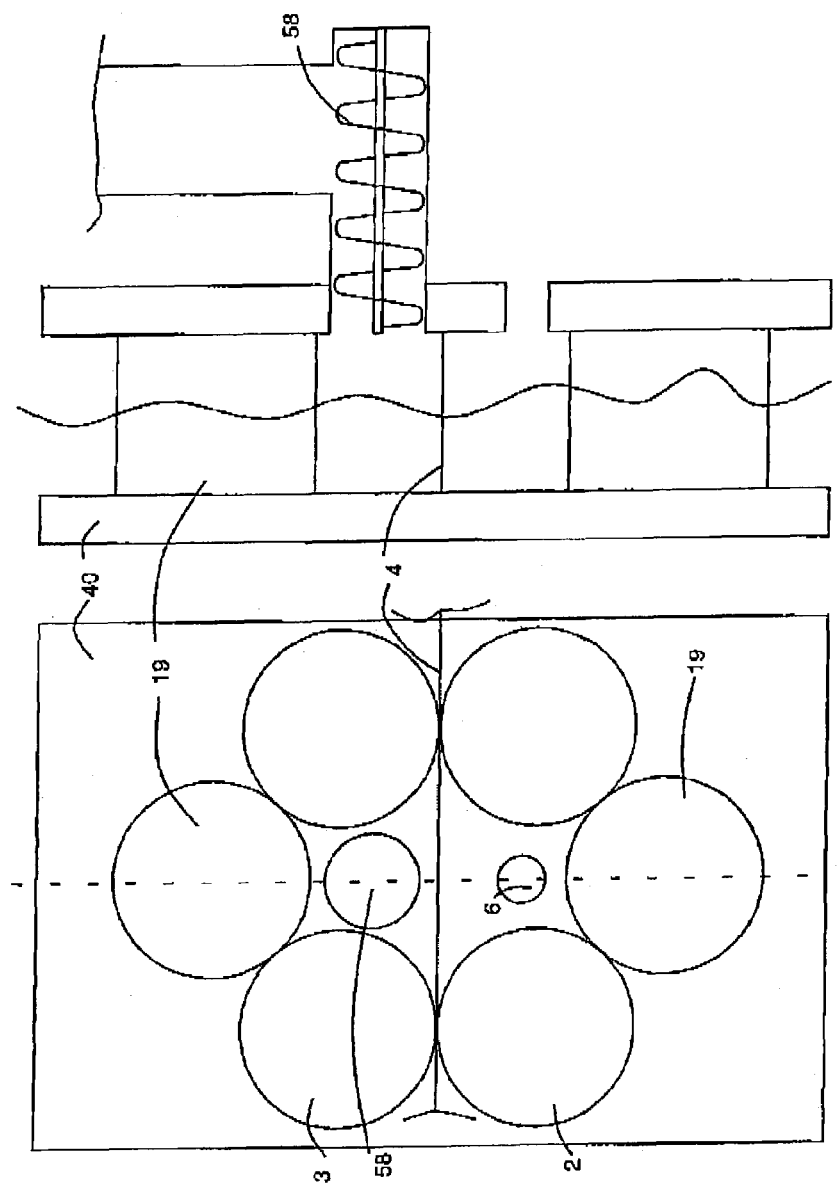

FIG. 19: shows an extension for a separation apparatus as described in the FIGS. 12-14. The extension consists of a screw conveyor (58) feeding the separation apparatus with a difficult to pump suspension.

Figure 20:
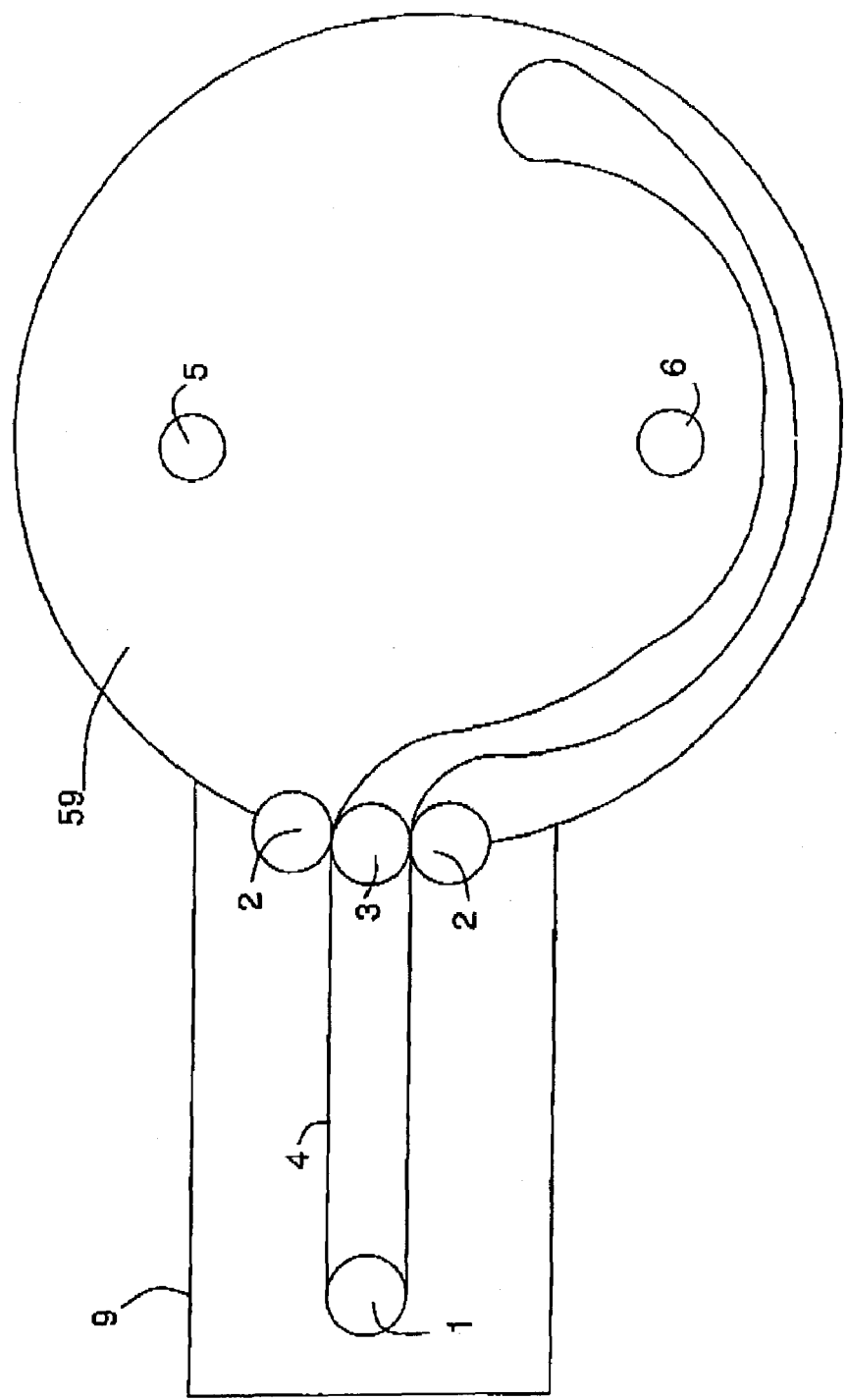

FIG. 20: shows a top view of a fermentor (59). The filter (4) comprises immobilised microorganisms. The fermentor (59) contains a suspension acting as a feed for the microorganisms on the filter (4). The filter (4) enters and leaves the fermentor (59) through the rollers (2) and (3). Outside the fermentor (59) the filter (4) is contained in a sterile housing (9). (1) is a supporting roll. In the sterile housing (9) the filter (4) can be cleaned and prepared for further fermentation. This embodiment may be used to clean waste water biologically. The waste water enters the fermentor (59) through inlet (5) and leaves through outlet (6).

Figure 21:
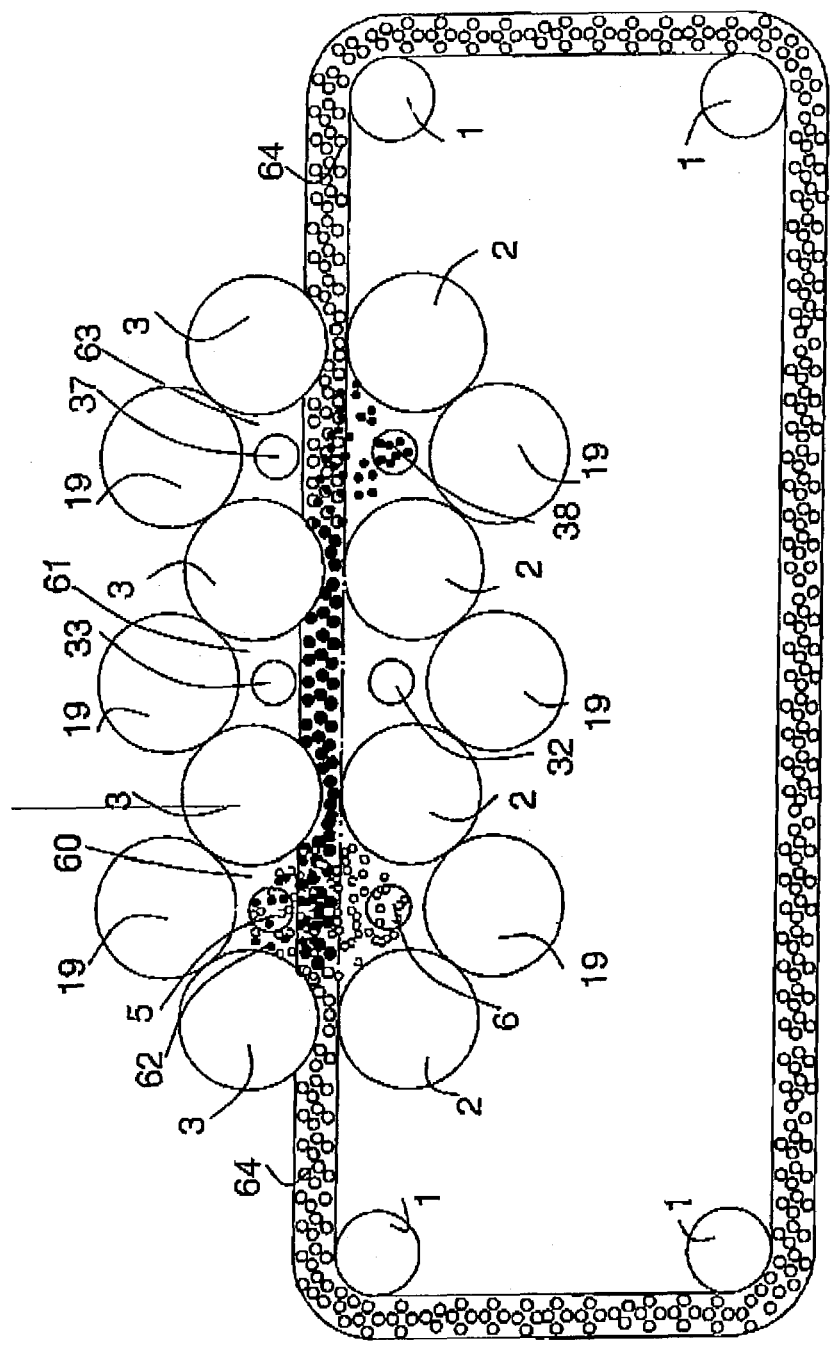

FIG. 21: shows the separation apparatus comprising a filter (64) capable of uptake and rejection of material, e.g. uptaken material can be removed from the filter by applying a liquid having a appropriate pH value. (5) and (33) are inlets, (1) are support rollers. (19) are rollers closing the separation environment by connecting rollers (3) and (2) respectively. A first suspension enters through (5) and leaves through (6). In the chamber (60) a specific material (62) of the suspension is taken up by the filter (64) while the remaining first suspension exits through outlet (6). The filter (64) is passed through the rollers (3) and (2) into chamber (61). Here, a second suspension enters through (33) and leaves through (32) to remove any remains of the rejected material. The filter (64) is then passed through the rollers (3) and (2) into chamber (63), where a third suspension with an appropriate pH value enters through (37) and leaves through (38) thereby removing the specific material (62) from (64).

Figure 22:
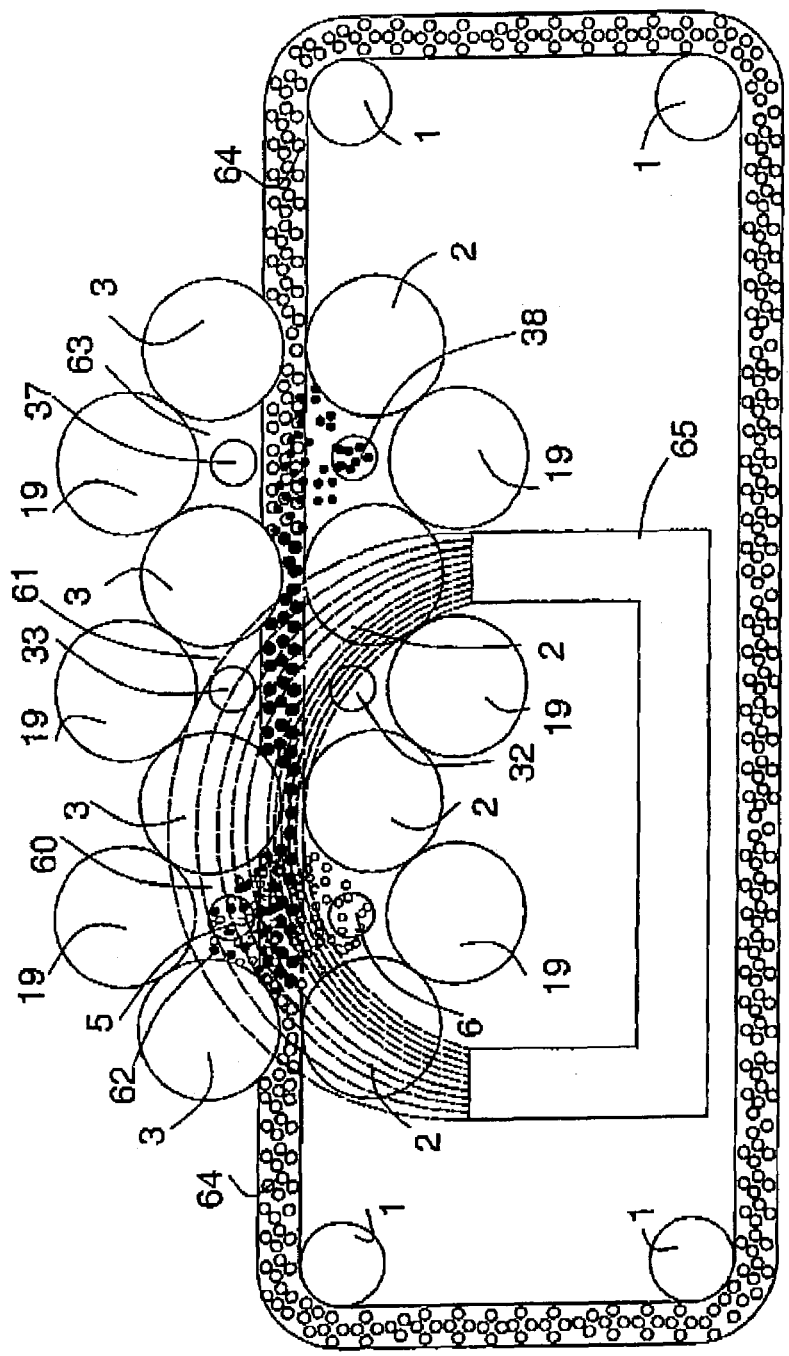

FIG. 22: shows the separation apparatus comprising a filter (64) capable of uptake and rejection of material. (5) and (33) are inlets, (1) are support rollers and (65) is a magnet applying a magnetic field to an area of the filter (64). (19) are rollers closing the separation environment connecting rollers (3) and (2) respectively. A first suspension enters through (5) and leaves through (6). In the chamber (60) a specific material (62) of the suspension is taken up by the filter (64) while the remaining first suspension exits through outlet (6). The filter (64) is passed through the rollers (3) and (2) into chamber (61). Here, a second suspension enters through (33) and leaves through (32) to remove any remains of the rejected material. The filter (64) is then passed through the rollers (3) and (2) into chamber (63), where a third suspension enters through (37) and leaves through (38) thereby removing the specific material (62) from (64).

Figure 23:
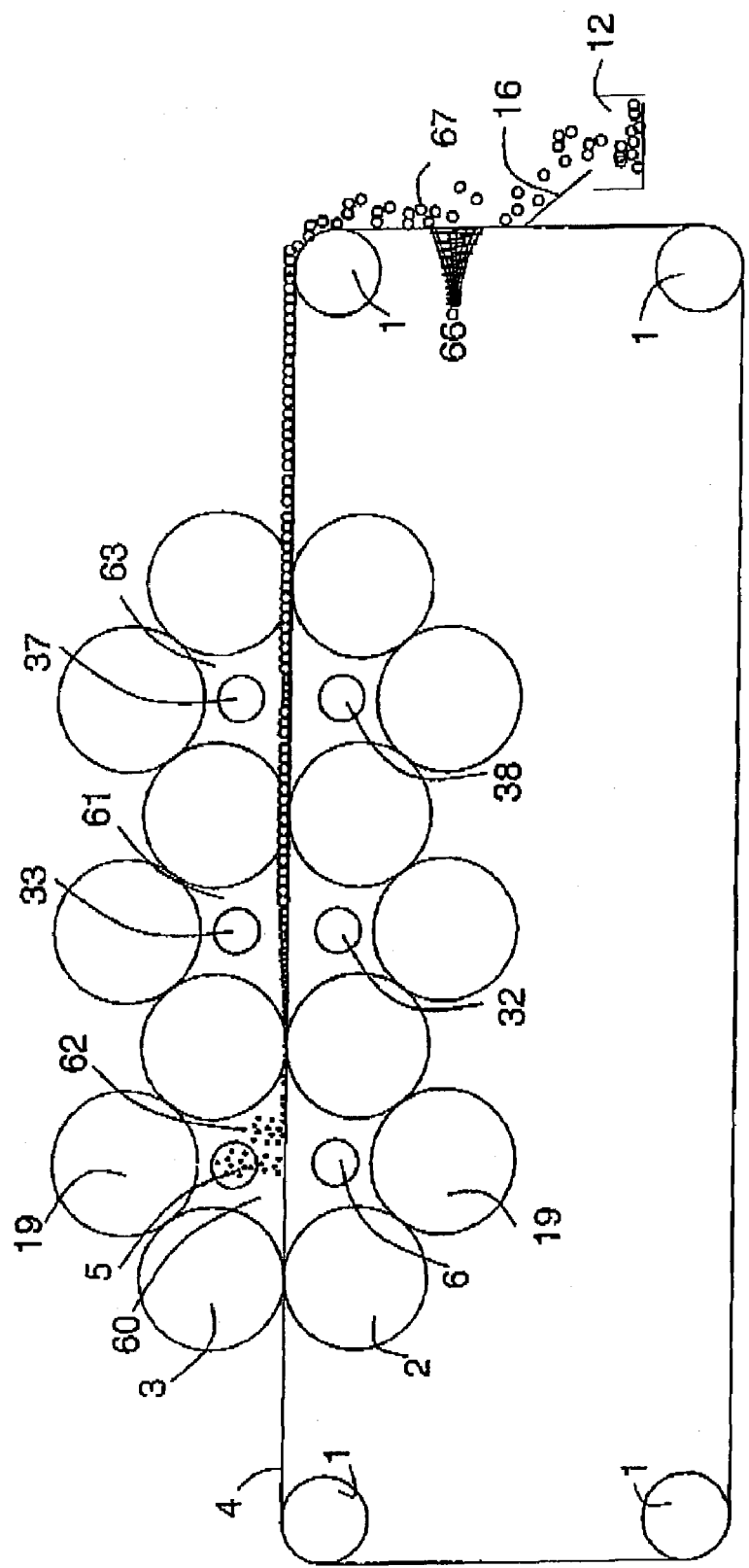

FIG. 23: shows a separation apparatus comprising a filter (4) and rollers (19) connecting rollers (3) and (2) respectively. Crystals (62) enter through inlet (5) of chamber (60). Here, the outlet is (6). In chamber (61) the crystals come in contact with for example a saturated suspension which enters through (33) and leaves through (32), whereby the crystals on the filter (4) grow. In an optional chamber (63) the crystals can be washed with a washing medium entering through inlet (37) and leaving through outlet (38). By drying the filter (4) with a drying device (66) the crystals (67) are removed from the filter (4). A scraper (16) is provided in case the crystals (67) are stuck to the filter (4).

Figure 24:
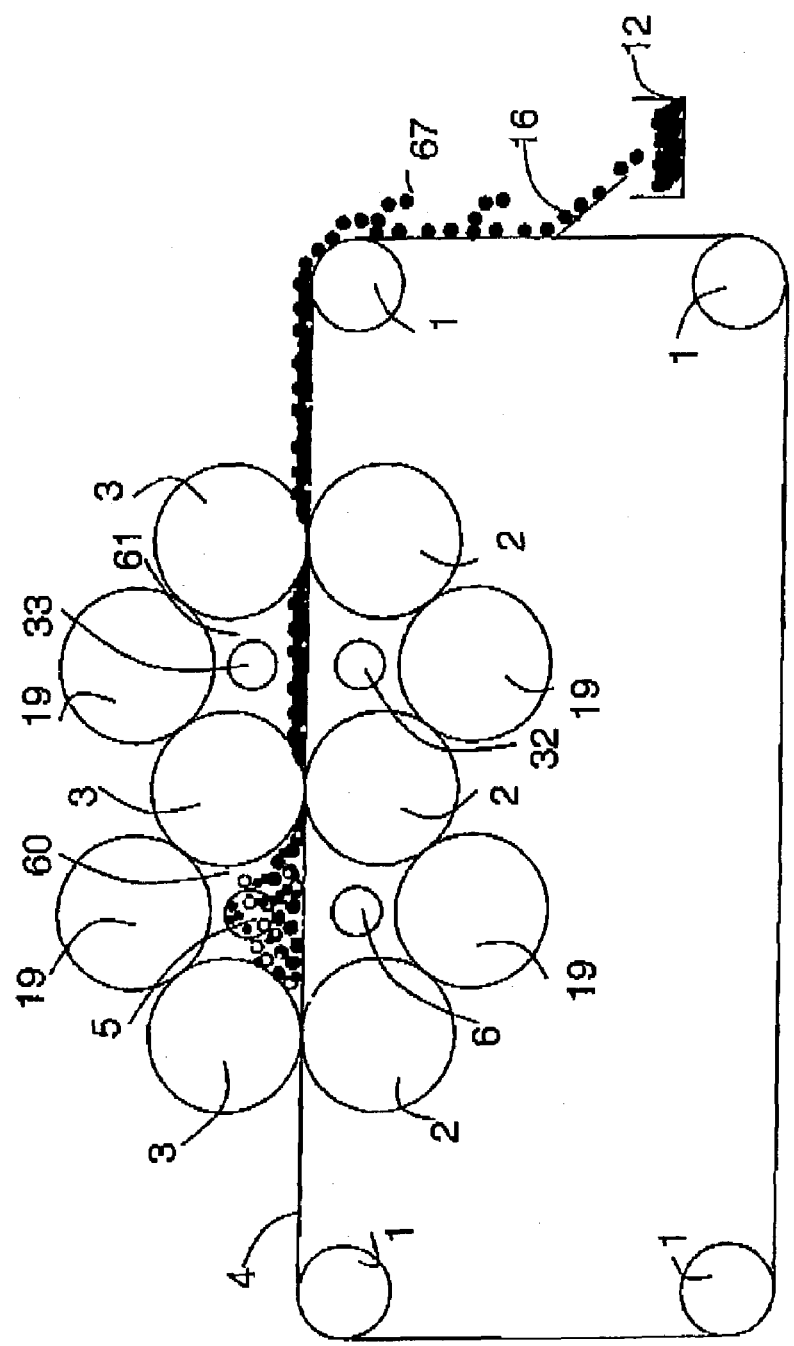

FIG. 24: shows a separation apparatus, wherein (1) are supporting rollers for the filter (4). (2), (3) and (19) are rollers enclosing the separation area. A suspension comprising filter aid enters chamber (60) through inlet (5) and the filtrate leaves through outlet (6). In chamber (61) the filter cake on filter (4) is washed with a washing medium entering through inlet (33) and leaving through outlet (32). The remaining filter cake (67) is scraped from the filter (4) with a scraper (16) and is collected in (12).

DETAILED DESCRIPTION OF THE INVENTION

Definitions

For the sake of clarity of the present text the term "separation" is used synonymously with the term "filtering".

By the term "filter cake" is meant an accumulation of dry matter before liquid is removed according to the present invention.

By the term "same enclosed filtration environment" is meant an environment, wherein the process of separating dry matter from liquid is performed within the same enclosed physical entity.

In the present context the term "substantially dry filter cake" covers an accumulation of dry matter after liquid has been removed.

By "particles and/or objects" are meant anything that the filter described by the invention will retain.

The following is a mutual description of both the method and the apparatus of the invention.

Filtration of Dry Matter From Liquid

It is within the scope of the invention to provide a separation method and apparatus used in the filtration of dry matter from liquid. The separation process may take place continuously.

The following is a description of both a method and an apparatus, also for embodiments where the present apparatus is not specifically mentioned.

Accordingly, it is within the scope of the present invention to provide a method for separating dry matter from liquid, comprising the steps of i) providing an enclosed separation environment capable of being pressure regulated, and in said enclosed separation environment ii) contacting at least one filter with a suspension accumulating dry matter on the at least one filter, and iii) obtaining a filter cake, and iv) passing the at least one filter through at least one set of rollers, whereby liquid is removed from the at least one filter, v) obtaining a substantially dry filter cake, vi) removing the substantially dry filter cake from the at least one filter, wherein steps i) to iv) are performed in the same enclosed separation environment either under vacuum or overpressure.

In a further embodiment the present method comprises the additional step vii), wherein the at least one filter is re-entering the suspension and the at least one filter is re-contacted with the suspension.

Filtration Environment

According to the invention the "same enclosed filtration environment" may in one embodiment comprise at least one chamber.

In another embodiment the "same enclosed separation environment" may comprise at least two chambers, such as at least three chambers, for example at least four chambers, such as at least five chambers, for example at least six chambers, such as at least seven chambers, such as at the least eight chambers.

Each chamber may according to the invention have a particular purpose. One chamber may have the function of being a receptive for suspension to be filtered. Another chamber may have the function of being receptive for a liquid or suspension to be used for washing the at least one filter. Such liquid or suspension may be neutral, such as water.

According to the invention the present apparatus and/or method may in one embodiment comprise at least two enclosed filtration environments.

In a further embodiment the present apparatus and/or method comprise at least three enclosed filtration environments, such as four enclosed filtration environments, for example five enclosed filtration environments, such as six enclosed filtration environments, for example seven enclosed filtration environments, such as eight enclosed filtration environments.

Pressure

The separation of dry matter from liquid is according to the invention performed in an enclosed separation environment capable of being pressure regulated. By the term "pressure regulated" is meant a separation environment where means for regulating/controlling the pressure in the enclosed separation environment are provided for.

The pressure may be regulated/controlled such that there is either vacuum or overpressure in the separation environment. By "vacuum" is meant a pressure determined in bar, which is lower than the atmospheric pressure. By "overpressure" is meant a pressure, which is higher than the atmospheric pressure. In the present invention the atmospheric pressure is defined as 0 (zero) bar.

In one embodiment the pressure exerted on the separation environment is from −1 to −0.05 bar relative to the atmospheric pressure.

In another embodiment the pressure exerted on the separation environment is from 0.05 to 10 bar relative to the atmospheric pressure.

In a further embodiment the pressure exerted on the separation environment is from 1.0 to 6 bar relative to the atmospheric pressure.

In yet a further embodiment the pressure exerted on the separation environment is from 1.5 to 4 bar relative to the atmospheric pressure.

Suspension

For the purposes of the present invention it is now made possible to provide a suspension to a separation/filtering method in a continuous manner. By this is meant that the suspension may be fed to the filtering apparatus, also within the scope of the invention, continuously throughout the filtering process. The volume of suspension fed and the velocity with which the suspension is fed to the filtering apparatus are dependent on factors, such as the physical nature of the suspension, the amount of suspension desired to be filtered, and the size and types of the at least one filter.

In another aspect of the invention the suspension is provided as a non-continuous stream. This may for example be the case when a suspension is stationary placed in a container wherein the at least one filter is brought in contact with the suspension.

By using the present method of filtering it is possible to separate dry matter from liquid at a highly efficient rate. In one embodiment of the invention the suspension has a dry matter content prior to the separation of at least 5%. However, in another embodiment of the invention the dry matter content of the suspension prior to separation is at least 10%. In yet another embodiment the dry matter content of the suspension prior to separation is at least 15%, for example at least 20%, such as at least 25%, for example at least 30%, such as at least 35%, for example 40%, such as at least 45%, for example at least 50%.

The present invention is capable of filtering suspensions having a relatively high dry matter content. Such suspensions may be for example juice comprising fruit pulp or sludge.

It is the purpose of the present invention to provide a method wherein the suspension after separation has a dry matter content of at the most 50%, such as at the most 45%, for example at the most 40%, such as at the most 35%, for example at the most 30%, such as at the most 25%, for example at the most 20%, such as at the most 35%, for example at the most 30%, such as at the most 25, for example at the most 20%, such as at the most 15%, for example at the most 10%, such as at the most 5%, for example at the most 2%.

Filter

According to the invention the at least one filter is brought in contact with the suspension. Upon the at least one filter's contact with the suspension the at least one filter may, in one embodiment, be moved through the suspension. This movement may be performed mechanically or it may be performed manually. In another embodiment it is envisioned that the at least one filter is brought in contact with the suspension where after it is stationary. In both the above embodiments the filter is moving in the direction of its own length.

The present method comprises at least one filter, such as at least two filters, for example at least three filters, such as at least four filters, for example at least five filters. The number of filters used for the purposes of the present invention is dependent on factors, such as the nature of the suspension, the volume of the suspension to be filtered. In one embodiment a first coarse pore filter may be used during a pre-filtering process followed by the use of a second fine pore filter for clarification filtering. By "nature of the suspension" is meant the physical and/or chemical properties, such as the toxic properties of the suspension; the type of material, and the dry matter content of the suspension.

Pore Size

The at least one filter of the invention may have a pore size according to for example the type of suspension to be filtered and the expectations of the level of dry matter content of the suspension after separation.

In one embodiment of the invention the filter has a pore size of at the most 5 mm, such as at the most 4 mm, for example at the most 3 mm, such as at the most 2 mm, for example at the most between 1 mm, such as at the most 75 µm, for example at the most 50 µm, such as at the most 25 µm, for example at the most 10 µm, such as at the most 1 µm, for example at the most 0.5 µm.

Permeability

The permeability of the filter according to the invention may be chosen with regard to the nature of the suspension to be filtered/separated, and of the aimed level of dry matter present after the separation. However, in one aspect of the invention the filter has a permeability of water of at least 20.000 l/h/bar/m$^2$, such as at least 30.000 l/h/bar/m$^2$, for example at least 40.000 l/h/bar/m$^2$, such as at least 50.000 l/h/bar/m$^2$, for example at least 60.000 l/h/bar/m$^2$, such as at least 70.000 l/h/bar/m$^2$, for example at least 80.000 l/h/bar/m$^2$, such as at least 90.000 l/h/bar/m$^2$, for example at least 100.000 l/h/bar/m$^2$.

Physical Form of Filter

The present method comprises in one embodiment a filter, which is a band. It is envisioned that the filter in another embodiment is moving in an enclosed circle, allowing the band in, yet a further embodiment to be endless.

In one embodiment the filter may be surrounded, by a frame on at least one side of the filter for the purpose of preventing the suspension from leaking into the apparatus from the filter and thereby providing a method having reduced leakage. The frame may be provided with teeth so as to assist the movement of the filter. The filter of the invention may be suited to fit the nature of the suspension to be separated. This may be the case when the filter is coated. In one embodiment the coating comprises gel particles. In another embodiment the filter is charged, for example, by carrying magnetic particles on the surface. By coating the filter with selective molecules it is possible to select particular particles/substances from the suspension.

The filter of the invention may be provided with ion-exchange material, wherein the filter has a regeneration zone following the filtration zone. This embodiment may be used advantageously to separate water from nitrate, for example.

In another embodiment of the invention the filter is provided with a support band. The support band has the advantage of re-enforcing the filter band, for example in situations where the dry matter content of the suspension is high and/or in situations where the weight of the dry matter is heavy. Further, the filter may be fragile and therefore in need of a support band, or there may be a drop of pressure across the filter, which makes the filter fragile and therefore in need of a support band.

In yet a further embodiment the filter is disposable.

Relative Temperature Difference

In one embodiment of the invention the filter has a temperature, which is below the temperature of the suspension to be separated. This embodiment may be applied to the filter for the up-concentration of liquids. Particular components in a suspension may be collected on the filter due to the relative temperature difference between the suspension and the filter. In one embodiment the temperature difference is at the most 10° C. In another embodiment the temperature difference is at the most 5° C.

Presence of Bacteria/Fungi

In another embodiment bacteria or fungi are present on the filter. The presence of bacteria or fungi may aid in fermenting processes. It is for instance envisioned that the present invention may be applied to the dairy industry, such as in the manufacture of products made from curdled milk.

Further, bacteria or mammal cells may be cultured in the at least one enclosed chamber of the present apparatus. This embodiment may be used in a laboratory setting. Suspension may be sprayed into the chamber whereby the relative air humidity in the chamber may be controlled.

Filter Material

The method of the present invention may comprise at least one filter made from various material. The material from which the filter is made may be suited to the individual suspensions.

In one embodiment the at least one filter is made from Juncus, grass, or plant fibers.

In a further embodiment the at least one filter is made from metal, rubber, or plastic.

In another embodiment the at least one filter is made from carbon fibre, or paper, or textile, or artificial textile.

According to the invention the filter may comprise at least one cavity. By the term "cavity" is meant a physical space within the filter material, wherein for example suspension may be found. The cavity structure of the filter may be compared to the structure of a sponge. The at least one cavity of the at least one filter may in one embodiment hold particles/compounds for binding to particular particles/compounds in the suspension to be separated.

In a further embodiment the at least one filter is made from a flexible material. By "flexible material" is meant a material capable of vertical and horizontal movement when exposed to physical pressure. Such material may for example be rubber or plastic.

In another embodiment the at least one filter comprises at least one cavity and is made from a flexible material. The flexible material may aid in the liquid being pressed from the filter cake when the filter cake on the filter is passed through at least one set of rollers.

The filter may comprise a support in a further embodiment. An example of such an embodiment can be found in FIG. 18.

In yet another embodiment of the invention the at least one filter is sterile. Such sterile filter may be used in the separation of sterile suspensions, for example pharmaceutical compositions where sterility is vital for the successful quality of the invention.

Filtering Capacity

For the purpose of the present methods the at least one filter is capable of filtering at least 500 $l/m^2/h$, such as at least 550 $l/m^2/h$, for example at least 600 $l/m^2/h$, such as at least 650 $l/m^2/h$, for example at least 700 $l/m^2/h$, such as at least 700 $l/m^2/h$, for example at least 800 $l/m^2/h$. The filtering capacity is an estimate covering the capacity before the actual filtering process has commenced.

Velocity of the Movement of the Filter

According to the invention the movement of the at least one filter when filtering may have a velocity of 0 km/h. In this embodiment the filter is not moving and thus has a velocity of 0 km/h.

In another embodiment the velocity of the filter movement may be in steps, comprising one step of a stand still, i.e. 0 km/h and at least one other step of movement, i.e a velocity of more than 0 km/h. The duration of the individual steps depends on parameters, such as the physical properties of the filter and the nature of the suspension to be filtered.

In another embodiment of the invention the at least one filter is moving at a velocity of between 0.2-100 km/h, such as between 0.4-70 km/h, for example between 0.6-50 km/h, such as between 0.8-20 km/h, for example between 1-10 km/h, such as between 1.5-5 km/h.

However, in a preferred embodiment the velocity of the movement of the filter is between 1 and 10 km/h.

In yet another preferred embodiment the velocity of the movement of the filter is between 1.5 and 5 km/h.

In a further embodiment the velocity of the movement of the filter is pressure controlled.

In yet a further embodiment the velocity of the movement of the filter is controlled by the flow rate of the suspension.

Roller Material

According to the invention the filter may be passing over at least one guide roller. Further, the filter is passing through at least one set of rollers. The following description of roller material covers both guide rollers and set of rollers.

In one embodiment the at least one roller from the at least one set of rollers is partially made from rubber. By "partially" is meant that the at least one roller from the at least one set of rollers may be made from various material, for example in one embodiment having a core of metal, such as steel and an outer layer of rubber.

In another embodiment at least one roller from the at least one set of rollers is having a core made from hard rubber and an outer layer made from rubber being softer than the core rubber. The shore value of the rubber may be between 20 and 95, such as between 60 and 90.

Further, in another embodiment at least one roller from the at least one set of rollers is made from nylon.

In yet another embodiment at least one roller from the at least one set of rollers is made from plastic.

In an even further embodiment at least one roller from the at least one set of roller is made from felt.

The at least one set of rollers of the invention may be made from identical material or it may be made from different material. The individual rollers may be made of one material or a variety of materials.

In a preferred embodiment the individual rollers from the at least one set of rollers are made from stainless steel and rubber.

In another preferred embodiment the at least one guide roller is made from rubber. In yet another embodiment the at least one set of rollers has a temperature of below 0° C., such as below −2° C., for example below −5° C.

In a further embodiment at least one roller of the at least one set of rollers has a temperature of below 0° C., such as below −2° C., for example below −5° C. and at least one other roller of the at least one set of rollers is made from rubber, or another material as previously described. When the at least one roller of the at least one set of rollers has a temperature below 0° C. it is possible for water to be removed from the suspension in the form of ice positioned on the at least one roller having a temperature below 0° C.

Further, the at least one set of rollers may in one embodiment have a temperature of below 0° C. (zero degrees celcius) as mentioned above and at least one other set of rollers may be made from rubber or another material as previously described.

Inflatable Rollers

Further, it is within the scope of the invention to provide at least one set of rollers being inflatable. Inflatable rollers may in one embodiment enforce the tightness with which the rollers embrace the at least one filter. In a further embodiment only a part of the rollers are inflatable, such as the end portion of the individual roller. In another embodiment the first individual roller of an at least one set of rollers is inflated in at least one area, which is different from the at least one area inflated in the second individual roller.

The embodiment, wherein the at least one set of rollers has grooves is also within the scope of the invention. The grooves may be perforated making it possible for liquid to pass through the perforations in the grooves. The grooves may aid the movement of the dry matter along the filter. Grooves may also aid the de-liquidation of the suspension by aiding the movement of liquid from the rollers into the at least one chamber.

According to the invention the at least one set of rollers is exerting a simultaneous force on the at least one filter. It is envisioned that the at least one set of rollers may comprise two or more rollers situated opposite to another set of rollers comprising two or more rollers. For example, one an embodiment where the at least one set of rollers comprise two rollers, one of said two rollers is situated opposite the other of said two rollers. The term "opposite" in this context means that the filter is placed in between the two rollers.

Furthermore, in one embodiment the at least two or more sets of rollers are used in the present method and in this way making it possible to exert pressure on the filter with varying degrees. The at least two sets of roller are in another embodiment placed transposed.

Roller Force

In the method according to the invention the at least one set of rollers is capable of exerting a pressure of 5 kg/cm$^2$ on the at least one filter, such as at least 10 kg/cm$^2$ on the at least one filter, for example at least 15 kg/cm$^2$ on the at least one filter, such as at least 20 kg/cm$^2$ on the at least one filter, for example at least 25 kg/cm$^2$ on the at least one filter, such as at least 30 kg/cm$^2$ on the at least one filter, for example at least 35 kg/cm$^2$ on the at least one filter, such as at least 40 kg/cm$^2$ on the at least one filter, for example at least 45 kg/cm$^2$ on the at least one filter, such as at least 50 kg/cm$^2$ on the at least one filter.

Removal of Substantially Dry Filter Cake

Once the dry matter has been collected on the at least one filter it may according to the invention be removed. The dry matter collected on the at least one filter is denoted "substantially dry filter cake". The removal of the substantially dry filter cake may take place simultaneously with the continuation of the separation process, i.e. the fact that the substantially dry filter cake is being removed does not influence the continuation of the separation process.

Accordingly, in one embodiment of the invention the substantially dry filter cake is removed from the at least one filter by the means of compressed air.

In a second embodiment the substantially dry filter cake is removed from the at least one filter by the means of vibration.

In a further embodiment the substantially dry filter cake is removed from the at least one filter by the means of scraping. The scraper may be selected among a vast variety of materials and the scraper may also be a filter itself.

Cleaning of Filter

It is a purpose of the invention to provide a method wherein the at least one filter may be recycled. This requires the cleaning of the at least one filter. The durability of the at least one filter may depend upon the type of filter, the nature of the suspension and time of use of said filter.

The cleaning of the filter according to the invention may in one embodiment be performed by enzymes, which are capable of engulfing dry matter material residues on the at least one filter.

In another embodiment the at least one filter is cleaned by the means of high-pressure washing.

Further, in yet another embodiment the at least one filter is cleaned by chemicals, such as a detergent.

For reasons of clarification the above mentioned description of the present method is also valid for the apparatus of the present invention.

Filter Cake

The substantially dry filter cake obtained by the present invention may have a dry matter content of at least 30%, for example at least 40%, such as at least 50%, for example at least 60%, such as at least 70%.

It is within the scope of the present invention to provide a filter without perforations. This means that the filter does not have pores. The non-perforated filter may in such embodiment separate dry matter from liquid by the collection of dry matter. FIGS. 16, 20 and 23 are examples of such an embodiment. The material of such a filter may be any of the above mentioned filter materials.

Use of Substantially Dry Filter Cake

The use of the substantially dry filter cake is also within the scope of the present invention. In one embodiment the substantially dry filter cake may be used for animal feed. In another embodiment the substantially dry filter cake may be used as insulating material, for example in building constructions. In another embodiment the textile industry may use the substantially dry filter cake as insulation material in, such as outdoor equipment articles, for example sleeping bags.

Use of Method and Apparatus

Further, the use of the method and the apparatus as defined herein is within the scope of the invention.

The present invention may be used in a vast variety of commercial industries. One such use may be in the food industry. For certain application areas, such a juice making the invention may additionally be used in private homes. Here the present invention may be applied to any food suspension where it is desirable to separate dry matter from liquid.

Juice

One example of such an application is in the manufacture of juice, wherein it is desired to separate fruit or vegetable etc. components from the fruit or vegetable etc. liquid. Further, filter aid may be removed from liquid juice.

In a preferred embodiment fruit or vegetable etc. components are separated from the fruit or vegetable liquid without the aid of enzymes or heating. This provides for a more natural product because more nutrients are preserved by using the present invention when compared to conventional separation techniques using for example enzymes or/and heating. This cautionary treatment may be used in the manufacture of a variety of food products. Further, filter aid may be removed from liquid juice.

Brewing

Another example of the application of the present invention is in the brewery industry. Here, in one embodiment malt may be removed from mask to obtain wort. In another embodiment trub may be removed from wort to obtain trub-free wort. In yet another embodiment yeast cells are removed from ready-made beer obtaining yeas-free beer. In a further embodiment haze is removed from yeast-free beer obtaining ready to drink beer.

Winemaking

A further example of the application of the present invention is in the winemaking industry. Here, in one embodiment pulp may be removed from crushed grapes. In another embodiment yeast cells are removed from ready-made wine obtaining yeast-free wine. In a further embodiment haze is removed from yeast-free wine obtaining ready to drink wine.

The present invention may replace conventional winemaking techniques by not using enzymes in the winemaking process. However, in a further embodiment the filter cake obtained from the filtering process may be dehydrated and enzymes added. This is performed to extract colour and remaining juice. (see the illustration in FIG. 10).

Dairy Industry

The present separation method/apparatus may be applied to the separation of bacteria or fat from raw milk. Further, spores may be removed from milk used for cheese-making. In another embodiment water, protein, or lactose is removed from whey.

Eatable Oil Industry

Further, according to the invention it is envisioned that the present method and apparatus may be used in the eatable oil industry. For example by separating liquid, i.e. oil from the source of said oil, the source being for example components of olives, various seeds, and other sources of eatable oils. In a preferred embodiment a grass filter type is used for this application. In a further embodiment of the invention bleach soil is removed from crude eatable oil. The present invention may replace the conventional screw presser.

Sludge Treatment

In another aspect of the invention the use of the method and apparatus may be for sludge treatment, for example by eliminating unwanted particles before it re-enters the surrounding environment. Further, It is within the scope of the invention to recycle waste-water by applying the present invention. Such re-cycling may be applied to commercial car washing.

Paper/pulp Industry

In yet a further aspect the use of the present method and apparatus is applied to the paper and pulp industry.

Manure Treatment

In an environmental aspect of the invention the use of the present invention is for processing manure. This is an important process associated with modern agricultural industries. The manure may be subjected to the present separation process to eliminate water before re-cycling the manure, for example in a bio-gas plant.

Biomass

Further, the present invention may be used to remove water, dry matter, and germs from fermenting liquids, and as a pre-treatment prerequisite to sterilise a substrate used in the fermenting process.

Pharmaceuticals

The present invention may in a further embodiment be used in the pharmaceutical industry. For example by applying the separation method in the purification of pharmaceutical compositions.

Cosmetics

Further, the invention may in another embodiment be used in the cosmetics industry for the removal of impurities from cosmetic products, such as soap, make-up and moisturizers.

Coffee Machines

It is further envisioned that the present invention may be used in an automatic coffee machine. By applying the present invention the coffee made will maintain the same strength throughout the brewing process.

Floor Cleaning Machines

Another application of the present method and apparatus is for use in floor cleaning machines. It is envisioned that water used in industrial floor cleaning machines may be recycled because the filtering process is performed at the same time as the floor is being cleaned.

Drinking Water

The present invention may further be used to remove nitrate, bacteria and/or ochre from drinking water.

Other Applications

The present invention may be used to separate impurities from paint; biological material, such as plant material from gutter outflow; impurities from gasoline; impurities from blood and dry matter from water from a kitchen sink outlet.

EXPERIMENTALS

Example 1

A pulp of black currant was filtered through a nylon filter cloth with 5 micrometer pores. Afterwards the filter cloth with filter cake was rolled between two rubber sheets. After rolling the filter cake fell readily off of the filter cloth.

The dry matter content before filtration was 14.6% after filtration it was down to 12.7%.

The filter cake before rolling had a dry matter content of 21.2% after rolling it was up to 42.9%.

In another experiment a pulp of black currant was filtered through a metal filter sheet with 250 micrometer pores. The filter sheet with filter cake was rolled between two rollers. After rolling the filter cake fell off the filter sheet.

The dry matter content before filtration was 11.5% after filtration it was down to 10.2%.

The rolled filter cake had a dry matter content of 32.3%.

Example 2

Apples were mashed and filtered at room temperature without any heat or enzymatic treatment. The filtering was performed on a prototype filter equipment comprising rollers to press the filter cake and enclose the separation area, and a Sefar Nitex 03-1/1 filter from Sefar Inc supported by a metal sheet filter with pores of 120 micrometers.

The experiment was carried out both with smooth rollers and with a roller with grooves. The mashed apple suspension had a dry matter content of 12.6%. After filtration the apple suspension had a dry matter content of 10.7%. The pressed filter cake had a dry matter content of 31.5%. The filter cake collected by the roller with grooves had a dry matter content of 25.4%.

Example 3

Carrots were mashed and filtered at room temperature without any heat or enzymatic treatment. This was performed on a prototype filter equipment comprising rollers to press the filter cake and enclose the separation area, and a Sefar Nitex 03-1/1 filter from Sefar Inc supported by a metal sheet filter with pores of 120 micrometers.

The experiment was carried out both with smooth rollers and with a roller having grooves. The carrot suspension had a dry matter content of 11.3%. After filtration the carrot juice had a dry matter content of 8.3%. The pressed filter cake had a dry matter content of 28.3%. The filter cake collected by the roller with grooves had a dry matter content of 31.3%.

Example 4

Grapes were mashed and the grape suspension was filtered at room temperature without any heat or enzymatic treatment on a prototype filter equipment comprising rollers to press the filter cake and enclose the separation area, and a Sefar Nitex 03-1/1 filter from Sefar Inc supported by a metal sheet filter with 120 micrometer pores.

The experiment was carried out both with smooth rollers and with a roller with grooves. The grape suspension had a dry matter content of 22.7%. After filtration the grape juice had a dry matter content of 18.5%. The pressed filter cake had a dry matter content of 44.1%. The filter cake collected by the roller with grooves had a dry matter content of 36.7%.

Example 5

Chopped corn suspended in water was filtered at room temperature on a prototype filter equipment comprising rollers to press the filter cake and enclose the separation area, and a filter with 5 micrometer pores supported by a metal sheet filter with 120 micrometer pores.

The suspension had a dry matter content of 22.6%. The resulting filtrate had a dry matter content of 15.7%. The pressed filter cake had a dry matter content of 45.4%.

Two samples of the suspension were centrifuged at 700 g for 10 minutes, yielding a sediment part of 34%.

Another experiment with a more coarse corn suspension using a metal sheet filter with 120 micrometer pores resulted in a suspension with a dry matter content of 34.5%. The filtrate had a dry matter content of 30.2%, and the pressed filter cake had a dry matter content of 48.7%.

Example 6

Mash of malt for beer production was filtered in a prototype filter equipment comprising rollers to press the filter cake and enclose the filter cake, and a Sefar Nitex 03-1/1 filter from Sefar Inc supported by a metal sheet filter with 120 micrometer pores.

The mash had a dry matter content of 36.0%. The wort (filtrate) had a dry matter content of 28.0% and the filter cake had a dry matter content of 45.4%.

The invention claimed is:

1. A method for separating particulate matter from liquid, comprising the steps of
   i) providing an enclosed separation environment including at least one chamber capable of being pressure regulated, wherein said enclosed separation environment is a separation area being at least partially enclosed by a roller which is a member of at least one set of rollers, and in said enclosed separation environment
   ii) introducing a suspension into the chamber;
   iii) depositing the suspension on at least a portion of a filter, such filter portion being disposed within the chamber, such that dry matter accumulates on the filter portion and forms a filter cake on the filter portion,
   iv) thereafter moving the filter portion and filter cake towards a set of rollers;
   v) passing the filter portion and filter cake through the rollers, while pressing the rollers toward one another to exert a squeezing force on the filter cake so that liquid is removed from the filter cake, thereby obtaining a substantially dry filter cake, wherein said filter portion and filter cake contact the rollers only while passing between the rollers,
   vi) moving the filter portion, containing the dry filter cake, out of the chamber, and
   vii) removing the substantially dry filter cake from the filter portion, wherein steps i) to v) are performed in the some enclosed separation environment either under vacuum or overpressure, said vacuum or overpressure providing a pressure differential over said at least one filter, and wherein the at least one filter is continuously passed through the at least one set of rollers when the enclosed separation environment is either under vacuum or overpressure.

2. The method according to claim 1, further comprising the step wherein the at least one filter is re-contacted with the suspension.

3. The method according to claim 1, comprising at least two enclosed separation areas.

4. The method according to claim 1, comprising at least three enclosed separation areas.

5. The method according to claim 1, wherein the pressure is from −1 to −0.05 bar relative to the atmospheric pressure.

6. The method according to claim 5, wherein the pressure is from 0.05 to 10 bar relative to the atmospheric pressure.

7. The method according to claim 5, wherein the pressure is from 1.0 to 6 bar relative to the atmospheric pressure.

8. The method according to claim 5, wherein the pressure is from 1.5 to 4 bar relative to the atmospheric pressure.

9. The method according to claim 1, wherein the suspension is provided as a continuous stream.

10. The method according to claim 9, wherein the suspension has a dry matter content prior to the separation of at least 5%.

11. The method according to claim 9, wherein the suspension has a dry matter content after the separation of at the most 50%.

12. The method according to claim 1, wherein the suspension is provided as a non-continuous stream.

13. The method according to claim 1, wherein the filter is moved through the suspension.

14. The method according to claim 1, wherein the filter has a pore size of at the most 5 mm.

15. The method according to claim 1, wherein the filter has a permeability of water of at least 20,000 l/h/bar/m$^2$.

16. The method according to claim 1, wherein the filter is a band.

17. The method according to claim 16, wherein the movement of the band is an enclosed circle.

18. The method according to claim 16, wherein the band is endless.

19. The method according to claim 1, wherein the filter is surrounded by a frame on at least one side.

20. The method according to claim 1, wherein the filter is coated.

21. The method according to claim 20, wherein the coating comprises gel particles.

22. The method according to claim 1, wherein the filter is charged.

23. The method according to claim 1, wherein the filter is magnetic.

24. The method according to claim 1, wherein the filter is grooved.

25. The method according to claim 1, wherein the filter is passing over at least one guide roller.

26. The method according to claim 1, wherein the at least one filter is made from Juncus or grass or metal or textile or artificial textile or plastic.

27. The method according to claim 1, wherein the at least one filter comprises at least one cavity.

28. The method according to claim 27, wherein the at least one filter is made from a flexible material.

29. The method according to claim 1, wherein the at least one filter is made from a flexible material.

30. The method according to claim 1, wherein the at least one filter is sterile.

31. The method according to claim 1, wherein the at least one filter is capable of filtering at least 500 l/m$^2$/h.

32. The method according to claim 1, wherein the at least one filter is not moving.

33. The method according to claim 1, wherein the at least one filter is moving at a velocity of between 0.2-100 km/h.

34. The method according to claim 1, wherein at least one roller from the at least one set of rollers is made from metal.

35. The method according to claim 1, wherein at least one roller from the at least one set of rollers is made from rubber.

36. The method according to claim 1, wherein at least one roller from the at least one set of rollers is made from nylon.

37. The method according to claim 1, wherein at least one roller from the at least one set of rollers is made from plastic.

38. The method according to claim 1, wherein at least one roller from the at least one set of rollers is inflatable.

39. The method according to claim 1, wherein at least one roller from the at least one set of rollers has a temperature of below 0° C.

40. The method according to claim 1, wherein the at least one set of rollers is capable of exerting a pressure of 5 kg/cm$^2$ on the at least one filter.

41. The method according to claim 1, wherein the substantially dry filter cake is removed from the at least one filter by means of compressed air.

42. The method according to claim 1, wherein the substantially dry filter cake is removed from the at least one filter by means of vibration.

43. The method according to claim 1, wherein the substantially dry filter cake is removed from the at least one filter by means of scraping.

44. The method according to claim 1, wherein the at least one filter is cleaned by enzymes.

45. The method according to claim 1, wherein the at least one filter is cleaned by the means of high-pressure washing.

46. The method according to claim 1, wherein the at least one filter is cleaned by chemicals.

47. The method according to claim 46, wherein the chemical is a detergent.

48. A substantially dry filter cake obtained by the method as defined in claim 1.

49. The substantially dry filter cake according to claim 48, having a dry matter content of at least 30%.

50. Use of the substantially dry filter cake as defined in claim 48 for animal feed.

51. Use of the method as defined in claim 1 in the food industry.

52. Use of the method as defined in claim 1 for sludge treatment.

53. Use of the method as defined in claim 1 in the paper and pulp industry.

54. Use of the method as defined in claim 1 for processing manure.

55. Use of the method as defined in claim 1 in the pharmaceutical industry.

56. Use of the method as defined in claim 1 in an automatic coffee machine.

57. Use of the method as defined in claim 1 in floor cleaning machines.

58. An apparatus for the separation of dry matter from liquid, said apparatus comprising:
   i) an enclosed separation environment including at least one chamber capable of being pressure regulated, wherein said enclosed separation environment is a separation area being at least partially enclosed by a roller which is a member of at least one set of rollers, said enclosed separation environment comprising
   ii) an inlet for introducing a suspension into the chamber; and
   iii) a filter; wherein said inlet deposits the suspension on at least a portion of said filter, said filter portion being disposed within the chamber, such that particulate matter accumulates on the filter portion and forms a filter cake on the filter portion, said apparatus further comprising
   iv) means for moving the filter portion and filter cake towards and through a set of rollers and thence out of the chamber;
   v) means for pressing the rollers toward one another to exert a squeezing force on the filter cake so that liquid is removed from the filter cake, thereby obtaining a substantially dry filter cake, wherein said filter portion and filter cake contact the rollers only while passing between the rollers; and vi) means for removing the substantially dry filter cake from the filter portion, wherein at least a portion of the separation area is maintained either under vacuum or overpressure, said vacuum or overpressure providing a pressure differential over said at least one filter, and wherein the at least one filter is continuously passed through the at least one set of rollers when said at least a portion of the separation area is either under vacuum or overpressure.

59. The apparatus according to claim 58, wherein the apparatus is configured so that the filter re-enters the suspension and is re-contacted with the suspension.

60. The apparatus according to claim 58, comprising at least two enclosed separation areas.

61. The apparatus according to claim 58, comprising at least three enclosed separation areas.

62. The apparatus according to claim 58, wherein the pressure is from −1 to −0.05 bar relative to the atmospheric pressure.

63. The apparatus according to claim 58, configured and operable to maintain the at least a portion of the separation areas at a pressure which is from 0.05 to 10 bar relative to the atmospheric pressure.

64. The apparatus according to claim 58, wherein the pressure is from 1.0 to 6 bar relative to the atmospheric pressure.

65. The apparatus according to claim 58, wherein the pressure is from 1.5 to 4 bar relative to the atmospheric pressure.

66. The apparatus according to claim 58, which is configured so that in the operation thereof the filter is moved through the suspension.

67. The apparatus according to claim 58, wherein the filter has a pore size of at the most 5 mm.

68. The apparatus according to claim 58, wherein the filter has a permeability of water of at least 20,000 l/h/bar/m$^2$.

69. The apparatus according to claim 58, wherein the filter is a band.

70. The apparatus according to claim 69, wherein the movement of the band is an enclosed circle.

71. The apparatus according to claim 69, wherein the band is endless.

72. The apparatus according to claim 58, wherein the filter is surrounded by a frame on at least one side.

73. The apparatus according to claim 58, wherein the filter is coated.

74. The apparatus according to claim 73, wherein the coating comprises gel particles.

75. The apparatus according to claim 58, wherein the filter is charged.

76. The apparatus according to claim 58, wherein the filter is magnetic.

77. The apparatus according to claim 58, wherein the filter is grooved.

78. The apparatus according to claim 58, wherein the filter is passing over at least one guide roller.

79. The apparatus according to claim 58, wherein the at least one filter is made from Juncus or grass or metal or textile or artificial textile or plastic.

80. The apparatus according to claim 58, wherein the at least one filter comprises at least one cavity.

81. The apparatus according to claim 80, wherein the at least one filter is made from a flexible material.

82. The apparatus according to claim 58, wherein the at least one filter is made from a flexible material.

83. The apparatus according to claim 58, wherein the at least one filter is sterile.

84. The apparatus according to claim 58, wherein the at least one filter is capable of filtering at least 500 l/m$^2$/h.

85. The apparatus according to claim 58, wherein the at least one filter is not moving.

86. The apparatus according to claim 58, wherein the at least one filter is moving at a velocity of between 0.2-100 km/h.

87. The apparatus according to claim 58, wherein at least one roller from the at least one set of rollers is made from metal.

88. The apparatus according to claim 58, wherein at least one roller from the at least one set of rollers is made from rubber.

89. The apparatus according to claim 58, wherein at least one roller from the at least one set of rollers is made from nylon.

90. The apparatus according to claim 58, wherein at least one roller from the at least one set of rollers is made from plastic.

91. The apparatus according to claim 58, wherein at least one roller from the at least one set of rollers is inflatable.

92. The apparatus according to claim 58, wherein at least one roller from the at least one set of rollers is maintained at a temperature of below 0° C.

93. The apparatus according to claim 58, wherein the at least one set of rollers is capable of exerting a pressure of 5 kg/cm$^2$ on the at least one filter.

94. The apparatus according to claim 58, which includes means for removing the substantially dry filter cake from the at least one filter by the means of compressed air.

95. The apparatus according to claim 58, which includes means for removing the substantially dry filter cake from the at least one filter by the means of vibration.

96. The apparatus according to claim 58, which includes means for removing the substantially dry filter cake from the at least one filter by the means of scraping.

* * * * *